(12) United States Patent
Kumar et al.

(10) Patent No.: US 12,717,607 B2
(45) **Date of Patent: *Aug. 25, 2026**

(54) TECHNIQUES FOR VIRTUAL MACHINE TRANSFER AND RESOURCE MANAGEMENT

(71) Applicant: Intel Corporation, Santa Clara, CA (US)

(72) Inventors: Sanjay Kumar, Hillsboro, OR (US); Philip R. Lantz, Cornelius, OR (US); Kun Tian, Shanghai (CN); Utkarsh Y. Kakaiya, El Dorado Hills, CA (US); Rajesh M. Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,932

(22) Filed: Apr. 23, 2024

(65) Prior Publication Data

US 2024/0345865 A1 Oct. 17, 2024

Related U.S. Application Data

(63) Continuation of application No. 18/153,177, filed on Jan. 11, 2023, now Pat. No. 11,995,462, which is a (Continued)

(51) Int. Cl.

| | |
|---|---|
| ***G06F 9/455*** | (2018.01) |
| ***G06F 9/30*** | (2018.01) |
| ***G06F 12/1009*** | (2016.01) |

(52) U.S. Cl.

CPC ...... *G06F 9/45558* (2013.01); *G06F 9/30101* (2013.01); *G06F 12/1009* (2013.01); *G06F 2009/45579* (2013.01)

(58) Field of Classification Search

CPC ............. G06F 9/45558; G06F 9/30101; G06F 12/1009; G06F 2009/45579

See application file for complete search history.

(56) References Cited

U.S. PATENT DOCUMENTS

| | | | |
|---|---|---|---|
| 7,752,030 | B2 | 7/2010 | Weissmann |
| 8,966,477 | B2 | 2/2015 | Cen et al. |

(Continued)

FOREIGN PATENT DOCUMENTS

| | | | |
|---|---|---|---|
| CN | 101031893 | A | 9/2007 |
| CN | 103036947 | A | 4/2013 |

(Continued)

OTHER PUBLICATIONS

Final Office Action, U.S. Appl. No. 16/479,395, filed Jun. 20, 2022, 17 pages.

(Continued)

*Primary Examiner* — April Y Blair
(74) *Attorney, Agent, or Firm* — Nicholson De Vos Webster & Elliott LLP

(57) ABSTRACT

Techniques for transferring virtual machines and resource management in a virtualized computing environment are described. In one embodiment, for example, an apparatus may include at least one memory, at least one processor, and logic for transferring a virtual machine (VM), at least a portion of the logic comprised in hardware coupled to the at least one memory and the at least one processor, the logic to generate a plurality of virtualized capability registers for a virtual device (VDEV) by virtualizing a plurality of device-specific capability registers of a physical device to be virtualized by the VM, the plurality of virtualized capability registers comprising a plurality of device-specific capabilities of the physical device, determine a version of the physical device to support via a virtual machine monitor (VMM), and expose a subset of the virtualized capability (Continued)

registers associated with the version to the VM. Other embodiments are described and claimed.

20 Claims, 9 Drawing Sheets

Related U.S. Application Data continuation of application No. 16/479,395, filed as application No. PCT/CN2017/079020 on Mar. 31, 2017, now Pat. No. 11,556,363.

(56) References Cited

U.S. PATENT DOCUMENTS

| | | | | |
|---|---|---|---|---|
| 9,099,051 | B2 | 8/2015 | Cheng et al. | |
| 9,436,751 | B1 | 9/2016 | Serebrin | |
| 10,447,728 | B1 | 10/2019 | Steinberg | |
| 2006/0075146 | A1 | 4/2006 | Schoinas et al. | |
| 2007/0050764 | A1 | 3/2007 | Traut | |
| 2007/0226450 | A1* | 9/2007 | Engbersen | G06F 12/1483 711/E12.096 |
| 2013/0268643 | A1 | 10/2013 | Chang et al. | |
| 2014/0185616 | A1* | 7/2014 | Bloch | G06F 9/45533 370/392 |
| 2014/0229769 | A1 | 8/2014 | Abraham et al. | |
| 2014/0229944 | A1 | 8/2014 | Wang et al. | |
| 2014/0298333 | A1 | 10/2014 | Yoshida et al. | |
| 2014/0331220 | A1 | 11/2014 | Barrat et al. | |
| 2015/0089010 | A1 | 3/2015 | Tsirkin et al. | |
| 2015/0160964 | A1 | 6/2015 | Nelson | |
| 2016/0283425 | A1* | 9/2016 | Sarangdhar | G06F 13/362 |
| 2017/0046185 | A1* | 2/2017 | Tsirkin | G06F 12/1009 |
| 2017/0075716 | A1 | 3/2017 | Bennett et al. | |
| 2017/0242720 | A1* | 8/2017 | Anand | G06F 3/0619 |

FOREIGN PATENT DOCUMENTS

| | | | |
|---|---|---|---|
| CN | 103368807 | A | 10/2013 |
| CN | 104133690 | A | 11/2014 |
| CN | 105264493 | A | 1/2016 |
| WO | 2016/074166 | A1 | 5/2016 |

OTHER PUBLICATIONS

International Preliminary Report on Patentability, PCT App. No. PCT/CN2017/079020, Oct. 10, 2019, 6 pages.

International Search Report and Written Opinion for the International Patent Application No. PCT/CN2018/080793, dated Jun. 28, 2018, 9 pages.

International Search Report and Written Opinion, PCT App. No. PCT/CN2017/079020, Jan. 5, 2018, 7 pages.

Non-Final Office Action, U.S. Appl. No. 16/479,395, filed Dec. 8, 2021, 16 pages.

Non-Final Office Action, U.S. App. No. 18/153,177, filed Sep. 29, 2023, 14 pages.

Notice of Allowance, U.S. App. No. 16/479,395, filed Sep. 15, 2022, 9 pages.

Notice of Allowance, U.S. App. No. 18/153,177, filed Feb. 7, 2024, 8 pages.

* cited by examiner

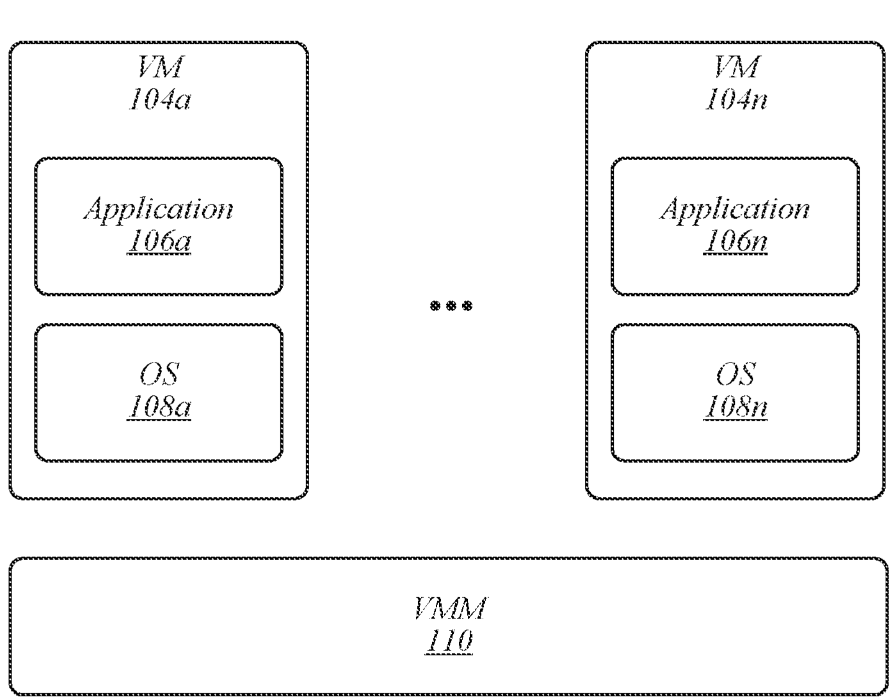
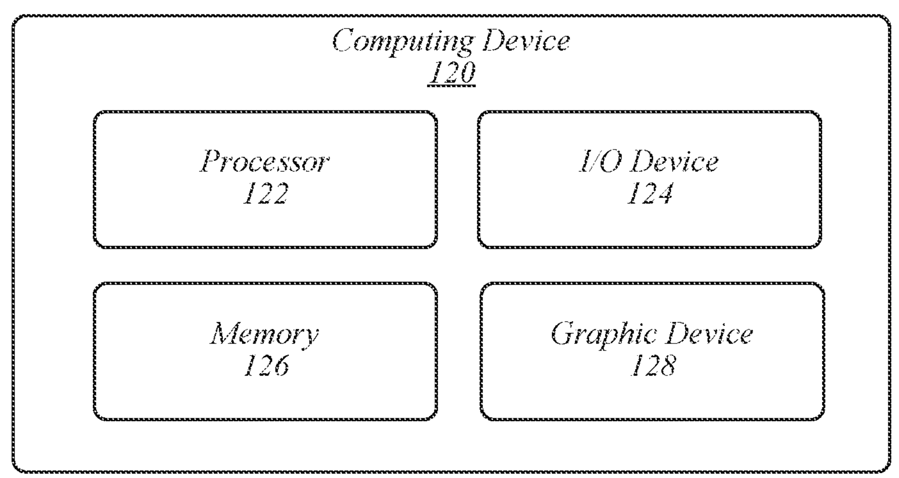
FIG. 1

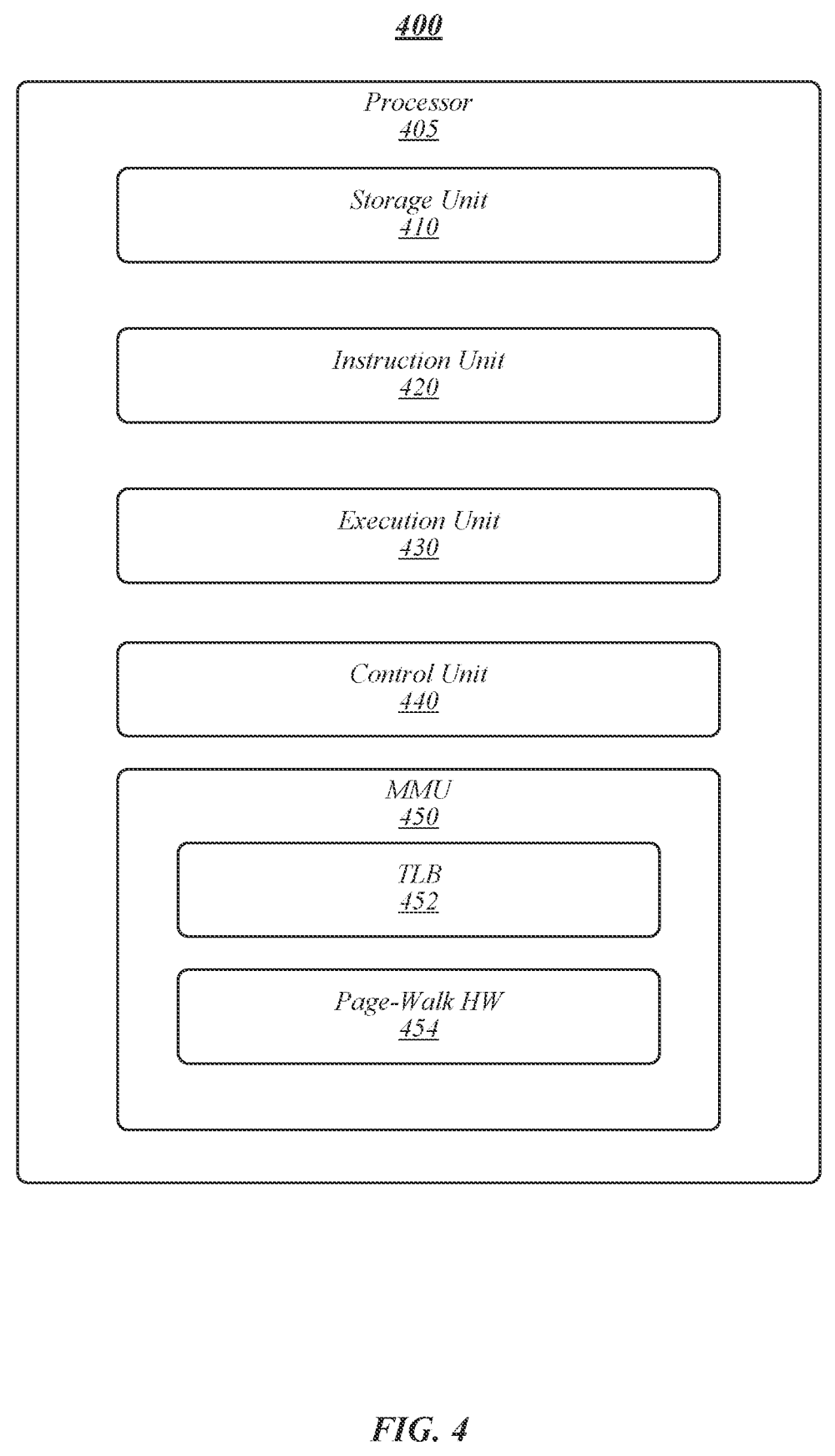

400

Processor
405

Storage Unit
410

Instruction Unit
420

Execution Unit
430

Control Unit
440

MMU
450

TLB
452

Page-Walk HW
454

FIG. 4

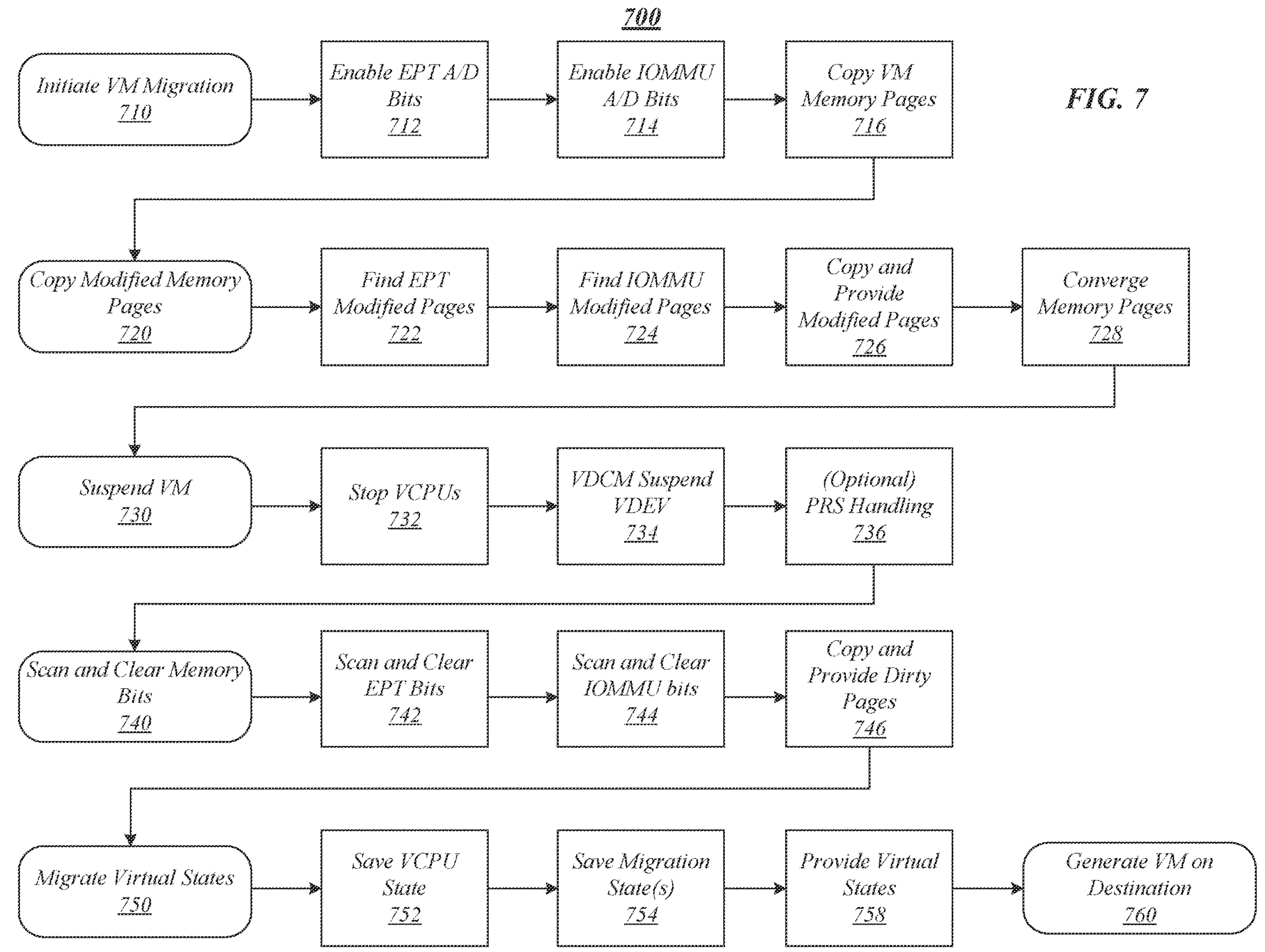
700
Initiate VM Migration 710
Enable EPT A/D Bits 712
Enable IOMMU A/D Bits 714
Copy VM Memory Pages 716
FIG. 7
Copy Modified Memory Pages 720
Find EPT Modified Pages 722
Find IOMMU Modified Pages 724
Copy and Provide Modified Pages 726
Converge Memory Pages 728
Suspend VM 730
Stop VCPUs 732
VDCM Suspend VDEV 734
(Optional) PRS Handling 736
Scan and Clear Memory Bits 740
Scan and Clear EPT Bits 742
Scan and Clear IOMMU bits 744
Copy and Provide Dirty Pages 746
Migrate Virtual States 750
Save VCPU State 752
Save Migration State(s) 754
Provide Virtual States 758
Generate VM on Destination 760

Storage Medium 8

Computer-Executable Instructions for 700

FIG. 8

TECHNIQUES FOR VIRTUAL MACHINE TRANSFER AND RESOURCE MANAGEMENT

TECHNICAL FIELD

Embodiments described herein generally relate to information processing and, more specifically, but not exclusively, to techniques for management of information processing systems in a virtualization computing environment.

BACKGROUND ART

Virtualization generally refers to the use of computer software to emulate or otherwise implement the functions or features of a physical computing device to allow, among other things, sharing of physical computing resources. For example, multiple virtual machines (VMs) can run concurrently on the same physical computing system. In the context of input-output (I/O) devices, virtualization technologies can be used to allow multiple VMs to share the same I/O hardware resources. Various systems, such as accelerators and high-performance I/O devices, may be virtualized using single root I/O virtualization (SR-IOV) or other architectures that provide for direct access to I/O devices or functions thereof from VMs.

A VM typically runs a preconfigured operating system (OS) image that includes required applications and/or drivers. In a data center environment, deployment of a VM may include providing a VM image from remote storage for installation on a physical machine. The data center may include a large number of physical machines that may include different hardware and/or software elements. For example, certain of the physical machines may include different generations of an I/O device. The presence of different hardware and/or software elements may lead to deployment compatibility issues when attempting to locate a target physical machine that is capable of operating with a particular VM being deployed within the data center. Migration of a VM generally involves transferring a VM from a source physical machine to a target physical machine within the data center. VM migration typically requires migrating various states of the VM from the source physical machine to the target physical machine, often over a plurality of phases. Illustrative states may include virtual memory state, virtual central processing unit (CPU) state, and virtual device state. Conventional migration techniques, such as within architectures that allow direct access to I/O devices from VMs, do not fully support complete and efficient migration of the virtual states from the source physical machine to the target physical machine. For example, existing VM systems lack driver interfaces for efficiently and accurately migrating device capabilities and/or device states.

In conventional virtualization computing environments, management of resources does not allow for flexible sharing or reassignment of VM processes. For instance, if system and/or VM resources are committed to a first function, the system and/or VM resources may not be reassigned to a second function, for example, if the first function is idle or does not require the system and/or VM resources. Therefore, VM management components, such as hypervisors or virtual machine managers (VMMs) are not able to fully utilize system and/or VM resources.

Accordingly, techniques for comprehensive and efficient virtualization resource management, deployment, and migration of VMs within a data center may be desired.

BRIEF DESCRIPTION OF THE DRAWINGS

FIG. 1 illustrates an embodiment of a first operating environment.

FIG. 4 illustrates an embodiment of a fourth operating environment.

FIG. 7 depicts an illustrative logic flow according to a first embodiment.

FIG. 8 illustrates an example of a storage medium.

DETAILED DESCRIPTION

Figure 2:
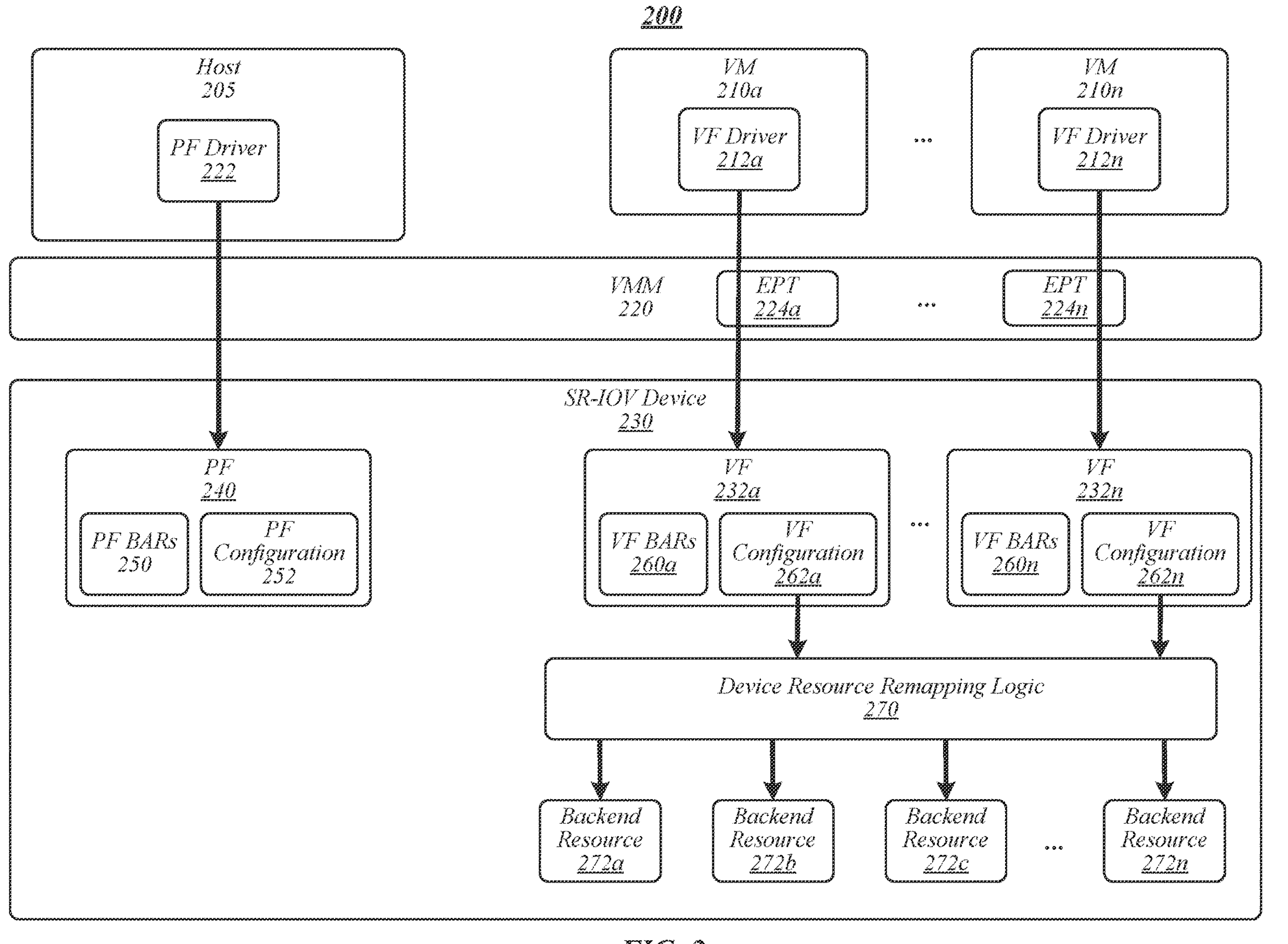
FIG. 2 illustrates an embodiment of a second operating environment.

Various embodiments may be generally directed toward systems and techniques for deploying and migrating ("transferring") domains, such as virtual machines (VMs) and/or containers, within a virtualized computing environment. Various embodiments may also be generally directed toward systems and techniques for managing resources within a virtualized computing environment. In some embodiments, the virtualized computing environment may use a single root input/output virtualization (SR-IOV) architecture. In various embodiments, the virtualized computing environment may use a scalable input/output virtualization (S-IOV) architecture. In some embodiments, the S-IOV architecture may employ a virtual device composition module (VDCM) configured to compose a virtual device (VDEV) using emulation and/or direct assignment such that non-performance critical VDEV state may be implemented in the VDCM.

In some embodiments, a device may expose its device-specific capabilities through a memory-mapped I/O (MMIO) space enumerated by the device driver. The device driver may implement software interfaces for virtual machine manager (VMM) query support of the device driver capabilities. Accordingly, a VMM may expose a subset of device specific capabilities to the VM which may be supported by multiple generations of an I/O device. In this manner, a data center resource manager (DCRM) may create a pool of compatible servers with devices (such as SR-IOV devices) to which a VM image may be transferred (for instance, deployed or migrated).

In various embodiments, an I/O device may implement device-specific interfaces for VDEV states, such as performance-critical VDEV states. Non-limiting examples of performance-critical VDEV states may include assignable interfaces (AIs) (see FIGS. 5 and 6), for instance, within an S-IOV architecture. In some embodiments, the I/O device may implement device-specific interfaces for VDEV states to stop/suspend AIs (or command interfaces), save AI state, and restore AI state on the target AI. In some embodiments, if a device supports page request service (PRS) to support shared virtual memory (SVM), virtual central processing units (VCPUs) and virtual functions (VFs) may be suspended without affecting PRS handling. In various embodiments, a host driver may implement software interfaces for the VMM to request such operations (for instance, suspend, save, and/or restore). Accordingly, a VMM may efficiently migrate VDEV state during VM migration by saving AI state, migrating AI state alone with non-performance critical states (which may be managed by VDCM), and restoring VDEV state on a destination AI. In some embodiments, accessed and dirty (A/D) bit support may be implemented in an I/O memory management unit (IOMMU), for instance, in a second-level address translation table (for example, of a CPU or other processing device).

In some embodiments, an apparatus may include at least one memory, at least one processor, and logic for transferring a virtual machine (VM), at least a portion of the logic comprised in hardware coupled to the at least one memory and the at least one processor, the logic to generate a plurality of virtualized capability registers for a virtual device (VDEV) by virtualizing a plurality of device-specific capability registers of a physical device to be virtualized by the VM, the plurality of virtualized capability registers comprising a plurality of device-specific capabilities of the physical device, determine a version of the physical device to support via a virtual machine monitor (VMM), and expose a subset of the virtualized capability registers associated with the version to the VM.

In some embodiments, an I/O device and/or VMMs may be configured such that the VMMs may emulate to provide resource management functionalities that overcome the deficiencies of conventional SR-IOV systems, such as mapping VDEVs directly to device backend resources (for instance, physical device functions, data resources, or other device resources), emulating MMIO interfaces to implement VMM memory overcommit, dynamically mapping VDEV paths (for instance, fast paths) between emulation and direct access to implement device overcommit, and/or composing a VDEV from AIs on multiple I/O devices.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1 illustrates an example of an operating environment 100 such as may be representative of some embodiments. As shown in FIG. 1, operating environment 100 may include a VM environment having a computing device 120, for instance, implemented as a processor-based platform configured to execute a VMM 110. Although implemented in software, VMM 110 may emulate and export a virtual machine interface to higher-level software. Such higher-level software may comprise a standard OS, a real-time OS, or a stripped-down environment with limited OS functionality that, for example, may not include OS facilities available in a standard OS in some embodiments. Alternatively, for example, the VMM 110 may be run within, or using the services of, another VMM. VMMs may be implemented, for example, in hardware, software, firmware, and/or any combination thereof. In at least one embodiment, one or more components of the VMM 110 may execute in one or more virtual machines and one or more components of the VMM 110 may execute on the platform hardware as depicted in FIG. 1. The components of the VMM 110 executing directly on the platform may be referred to as host components of the VMM 110. In another embodiment, examples of VMM 110 may comprise a hybrid virtual machine monitor, a host virtual machine monitor, or a hypervisor virtual machine monitor.

The computing device 120 may include various logic devices. Non-limiting examples of computing devices 120 may include a personal computer (PC), a server, a mainframe, a handheld device such as a personal digital assistant (PDA), a tablet, a smart phone or any other smart devices, an Internet Protocol device, a digital camera, a portable computer, a handheld PC such as a netbook or notebook, an embedded applications device such as a micro controller, a digital signal processor (DSP), a system on a chip (SoC), a network computer (NetPC), a set-top box, a network hub, a wide area network (WAN) switch, another processor-based system, and/or any combination thereof. Embodiments are not limited in this context.

Computing device 120 may include at least a processor 122 and memory 126. Processor 122 may be any type of processor capable of executing programs, such as a microprocessor, digital signal processor, microcontroller, and/or the like. Processor 122 may include microcode, programmable logic or hard coded logic for execution in embodiments. Although FIG. 1 shows only one such processor 122, computing device 120 may include a plurality of processors 122. Additionally, processor 122 may include multiple cores, support for multiple threads, and/or the like. Processor 122 may include microcode, programmable logic or hard-coded logic to perform operations associated with various embodiments described herein.

Memory 126 may comprise a hard disk, a floppy disk, random access memory (RAM), read only memory (ROM), flash memory, any other type of volatile memory devices or non-volatile memory devices, or combination of the above devices, or any other type of machine medium readable by processor 122 in various embodiments. Memory 126 may store instructions and/or data for performing program execution and other method embodiments. In some embodiments, some elements of the disclosure may be implemented in other system components, for example, in the platform chipset or in the system's one or more memory controllers.

VMM 110 may present to guest software an abstraction of one or more VMs 104*a-n*. VMM 110 may present the same or different abstractions of physical platform to different VMs 104*a-n*. Guest software, such as guest software running on each of VM 104*a-n*, may include a guest OS such as a guest OSs 108*a-n* and various guest software applications 106*a-n*. Guest software applications 106*a-n* may access physical resources (for instance, processor registers, memory, and I/O devices) within the VMs 104*a-n* on which guest software applications 106*a-n* are running and may perform various other functions. For example, guest software applications 106*a-n* may have access to all registers, caches, structures, I/O devices, memory and/or the like, according to the architecture of the processor and platform presented in VMs 104*a-n*.

In one embodiment, processor 122 may control the operation of VMs 104*a-n*. In one embodiment, in response to a VM 104*a-n* referencing a memory location in its virtual address space, a reference to an actual address in the physical memory of the host machine 120 (machine physical memory) may be generated by memory management module (not shown) in VMM 110, which may be implemented in hardware (sometimes incorporated into processor 122) and software (for example, in the operating system of the host machine). In the embodiment of FIG. 1, computing device 120 may include one or more I/O devices 124.

Computing device 120 may include one or more graphic control devices 128 that may be used to perform one or more graphics functions.

FIG. 2 illustrates an example of an operating environment 200 such as may be representative of some embodiments. More specifically, operating environment 200 may include a VM environment implemented using an SR-IOV architecture. As shown in FIG. 2, operating environment 200 may include a host 205, VMs 210*a-n*, a VMM 220, and an SR-IOV device 230. Each of VMs 210*a-n* may include one or more VF drivers 212*a*-212*n* that interact with respective VFs 232*a*-232*c* that are implemented, for instance, in SR-IOV device 230. In various embodiments, VFs 232*a-n* may include VF base address registers (BARs) 260*a-n*, for example VF BAR MMIO spaces, and/or VF configuration spaces 262*a-n*, for example, PCIe configuration spaces. A physical function (PF) may be implemented using PF drivers 222 operating in host 205 (or in VMM 220). PF driver 222 may include PF BARs 250 and PF configuration space 252. In various embodiments, SR-IOV device 230 may implement device resource remapping logic 270 to map each VF 232*a-n* to backend resources 272*a-n* (for instance, queues, contexts, etc.).

Various systems, such as accelerators and high-performance I/O devices, may be virtualized using an SR-IOV architecture, such as the architecture depicted in FIG. 2. In general, SR-IOV may specify that the physical device may include a single PF 240 and multiple VFs 232*a-n*, such that each VF 232*a-n* can be assigned to a VM 210*a-n* directly. A VF 232*a-n* may appear as a virtual I/O device to the VM 210*a-n*. VF driver 212*a-n* in VM 210*a-n* may directly access VF 232*a-n* MMIO space without VMM 220 involvement. VF drivers 212*a-n* may directly submit work to respective VFs 232*a-n* and the device may process the work from various VFs 232*a-n* (or VMs 210*a-n*) while providing isolation among the various VFs 232*a-n*. For instance, a VF driver 212*a-n* may see a real VF 232*a-n* and all of the VFs 232*a-n* capabilities. VF drivers 212*a-n* may interact with VFs 232*a-n* directly by using a CPU second level page table (for example, an EPT, EPT 224*a-n*, and/or the like).

A VM typically runs a preconfigured OS image with all required packages, applications, device drivers (including drivers for assigned devices and SR-IOV VFs), and/or the like. In a data center environment, deploying (or starting) a VM may include downloading a VM from a remote storage location to a physical machine, for instance, using a data center resource manager (DCRM). The DCRM may be responsible for identifying a target physical machine when deploying the VM and/or migrating the VM. In the data center, there may be a large number of physical machines with certain types of SR-IOV devices and, therefore, a large number of target machines for a VM image. However, SR-IOV devices on such systems may not be identical versions, for instance, as data center hardware is regularly updated, replaced, and/or the like. Accordingly, for each type of SR-IOV device, target systems could have multiple generations of the I/O device (for instance, certain machines with a newer version of the I/O device, while others may have older generations). In addition, different generations of I/O devices may not be fully compatible with each other. For instance, a newer generation I/O device may contain new features that an older generation I/O device may not have.

The presence of multiple generations of I/O devices in the data center coupled with current SR-IOV virtualization architecture (for example, where guest OSs directly access assigned devices or VFs without any VMM involvement) may lead to migration and/or deployment compatibility issues within the data center environment. For example, it may be challenging if not impossible for a DCRM to select a target physical machine for deploying or migrating a VM with an assigned SR-IOV device VF. Since the VF driver sees the entire VF MMIO space and can access all its capabilities directly without any VMM involvement, the VF driver contained in the VM image must be compatible with the SR-IOV device present on the target system. Such requirements may mean that the VM image (for instance, containing the VF driver) may not work with the multiple generations of the SR-IOV device that exist in the data center. The DCRM may be challenged because the DCRM must find a target system with a compatible generation SR-IOV device for the VM image when starting or migrating the VM. Accordingly, even if there are available SR-IOV devices in the data center, the VM may not be able to use them because the VF driver may not be compatible with the SR-IOV VF. Such conditions may occur frequently in conventional data centers where multiple generations of the same SR-IOV device may be present on different systems.

Such multiple-generations issues may also occur with CPUs as various generations of CPUs may be present in a conventional data center. However, CPUs may include a CPU identification (CPUID) mechanism for software to find out the capabilities of the CPU. VMMs may use CPUID virtualization to enumerate and hide incompatible capabilities of newer CPUs to the VMs. In this manner, VMMs may create pools of compatible servers where the same VM image may be downloaded and run. However, conventional I/O devices lack an identifier functionality that is analogous to the CPU CPUID functionality.

In conventional SR-IOV architectures, the VMM does not control the VDEV seen by the VF driver. Each VF looks like a whole device to the VM and the VF driver directly accesses the VF (for instance, the entire MMIO space and all of its capabilities) without involving the VMM. Accordingly, the VDEV in the VM is composed of an entire VF in the SR-IOV device. Therefore, the VMM cannot hide or expose VF capabilities to the VF driver.

VMs may be migrated in a live or active state from a source physical machine to a target physical machine. Live VM migration requires migrating the memory state from the source physical machine to the target physical machine. In the first phase, the VMM migrates the entire memory to the target physical device while the VM is still running. In subsequent phases, the VMM migrates only the memory pages modified since the previous phase. The memory pages may be modified by the CPU and/or I/O devices. The VMM can track the CPU modified (or "dirty") pages, for example, through the A/D (access/dirty) bit support in extended page tables (EPTs). However, if the device (or the VF) is directly assigned to the VM, the VMM cannot determine the pages modified by the device (or the VF) because the VM directly submits memory commands (for example, direct memory accesses (DMAs)) to the device without VMM involvement. Accordingly, live migration is challenging, particularly if a VM has an assigned VF. Furthermore, conventional VMMs may not support VM migration if a VM has an assigned VF. A main issue with live memory migration of VMs with an assigned VF is that there is not A/D bit support in the IOMMU second-level page tables. Accordingly, there is no way for the VMM to detect VM pages modified by the assigned VFs.

In general, VM migration requires a VMM to migrate various VM states from a source physical machine to a target physical machine. Non-limiting examples of VM states may include a virtual (or VM) memory state, a virtual CPU (VCPU) state, and a virtual device state. If the VM has an assigned SR-IOV VF, the virtual device state may also include a VF state. However, since the VF driver accesses the VF MMIO without any VMM involvement, it is challenging for the VMM to migrate the VF state. For instance, an SR-IOV device may implement a PF driver interface to stop/suspend a VF, store the VF state on the source machine, and restore the VF state on the target machine. However, implementing processes for performing such VF state storage/restoration on a conventional SR-IOV device is complex, costly, and inefficient because a VF has significant state information on the SR-IOV device and the VF driver directly accesses the VF MMIO space without any VMM involvement.

Certain SR-IOV devices may support page request service (PRS), for instance, to support shared virtual memory (SVM). Suspension of VFs and VCPUs is generally more complex in a PRS-based system because PRS requests require the VM's VCPUs to be running. If a VCPU is running, the VCPU may continue to submit I/O commands to the device, potentially generating more PRS requests. Accordingly, conventional systems do not include a PF driver interface to stop/suspend a VF and save/restore a VF state. As a consequence, VM migration is typically not supported if the VM has assigned VFs (or PFs).

In addition, although SR-IOV allows an I/O device to be shared among multiple VMs, conventional SR-IOV architectures experience significant resource management limitations when virtualizing I/O devices. For instance, VM memory overcommit and VF overcommit conditions are difficult if not impossible to implement using conventional SR-IOV architecture and/or software. The implementation challenges arise from, among other things, because each VF implements an entire MMIO space of a VDEV and the VF driver (in the VM) directly accesses VF MMIO space without involving the VMM. Accordingly, the VDEV MMIO space in the VM may be composed entirely of VF MMIO space in the I/O device.

In some embodiments, a virtual environment may include an S-IOV architecture, for instance, where a virtual device composition module (VDCM) composes a VDEV using both emulation and direct assignment such that non-performance critical VDEV state(s) may be implemented in the VDCM. In addition, SR-IOV devices typically implement some, all, or substantially all I/O virtualization resource management processes in hardware. Consequently, SR-IOV software architecture implements limited resource management capabilities. However, an S-IOV architecture may implement various processes (including resource management) in software instead of hardware, such as, for instance, non-performance critical processes. In this manner, a VMM may have more opportunities to implement drastically improved resource management capabilities in host software.

Figure 3:
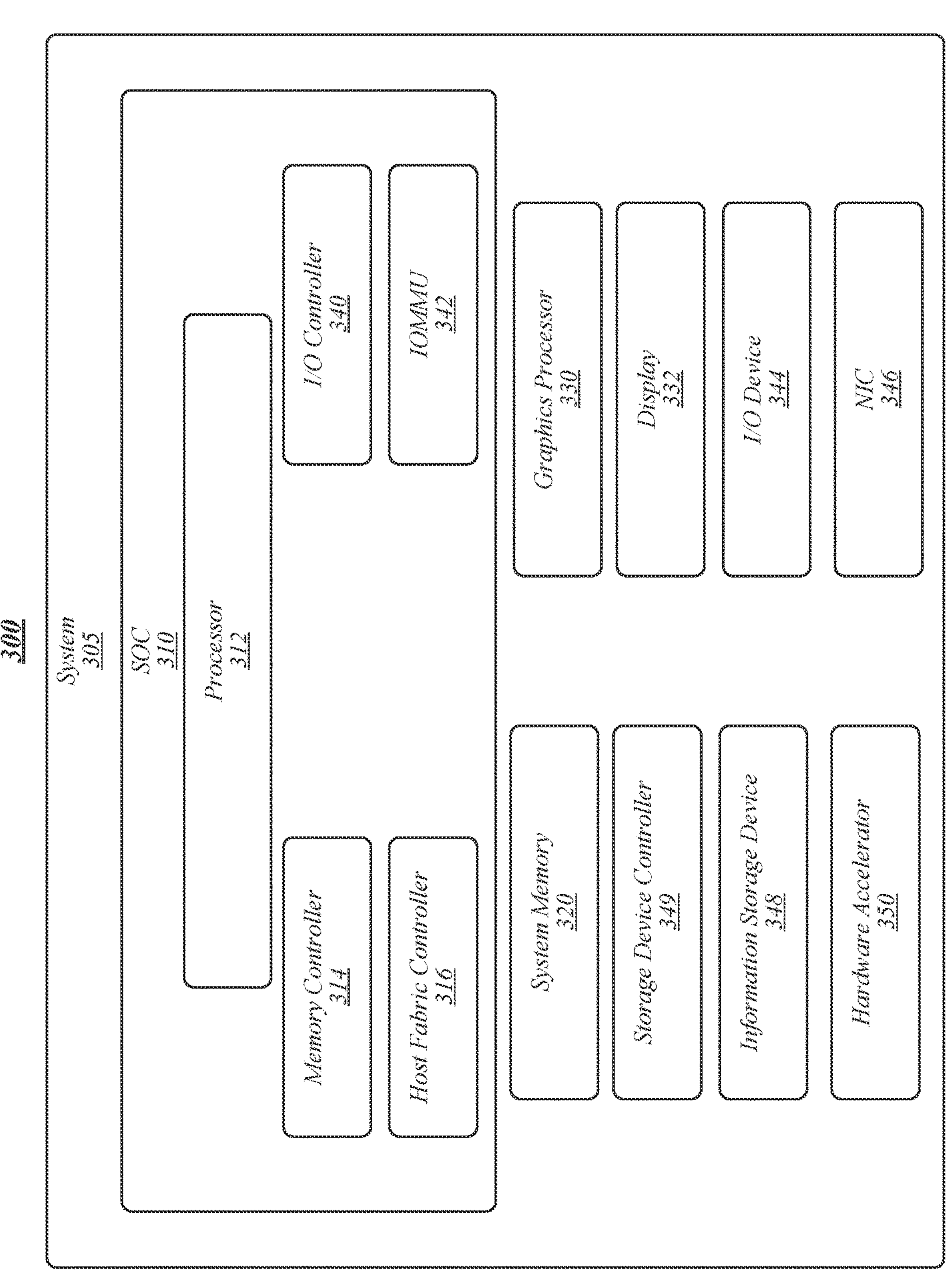
FIG. 3 illustrates an embodiment of a third operating environment.

FIG. 3 illustrates an example of an operating environment 300 such as may be representative of some embodiments. More specifically, operating environment 300 may include a VM environment implemented using an S-IOV architecture. As shown in FIG. 3, operating environment 300 may include a system 305 configured as an information processing system for scalable virtualization of I/O devices (S-IOV). System 305 may represent any type of information processing system, such as a server, a desktop computer, a portable computer, a set-top box, a hand-held device such as a tablet or a smart phone, or an embedded control system. System 305 may include a processor 312, a memory controller 314, a host fabric controller 316, an I/O controller 340, an I/O memory management unit (IOMMU) 142, a system memory 320, a graphics processor 330, and/or a hardware accelerator 350. System 305 may include any number of each of these components and any other components or other elements, such as additional peripherals and/or I/O devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 305, whether shown in FIG. 3 or not shown in FIG. 3, may be integrated or otherwise included on or in a single chip (a system-on-a-chip or SOC), die, substrate, or package, such as SOC 110.

System memory 320 may include, for example, dynamic random access memory (DRAM) or any other type of medium readable by processor 312. Memory controller 314 may represent any circuitry or component for accessing, maintaining, and/or otherwise controlling system memory 320. Host fabric controller 316 may represent any circuitry or component for controlling an interconnect network or fabric through which processors and/or other system components may communicate. Graphics processor 330 may include any processor or other component for processing graphics data for display 332. Hardware accelerator 350 may represent any cryptographic, compression, or other accelerator to which a processor may offload functionality such as the hardware acceleration of encryption or compression algorithms. I/O controller 340 may represent any circuitry or component, such as a chipset component, including or through which peripheral, input/output (I/O), or other components or devices, such as I/O device 344 (e.g., a touchscreen, keyboard, microphone, speaker, other audio device, camera, video or other media device, motion or other sensor, receiver for global positioning or other information, etc.), NIC 346, and/or information storage device 348, may be connected or coupled to processor 312. Information storage device 348 may represent any one or more components including any one or more types of persistent or non-volatile memory or storage, such as a flash memory and/or a solid state, magnetic, or optical disk drive, and may include its own storage device controller 349.

Processor 312 may represent all or part of a hardware component including one or more processors or processor cores integrated on a single substrate or packaged within a single package, each of which may include multiple execution threads and/or multiple execution cores, in any combination. Each processor represented as or in processor 312 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present specification may be implemented.

Processor 312 may be architected and designed to operate according to any instruction set architecture (ISA), with or without being controlled by microcode. Processor 312 may support virtualization according to any approach. For example, processor 312 may operate in the following two modes: a first mode in which software runs directly on the hardware, outside of any virtualization environment, and a second mode in which software runs at its intended privilege level, but within a virtual environment hosted by a VMM running in the first mode. In the virtual environment, certain events, operations, and situations, such as interrupts, exceptions, and attempts to access privileged registers or resources, may be intercepted, for instance, to cause the processor to exit the virtual environment (a VM exit) so that the VMM may operate, for example, to implement virtualization policies. The processor may support instructions for establishing, entering (a VM entry), exiting, and/or maintaining a virtual environment, and may include register bits or other structures that indicate or control virtualization capabilities of the processor.

FIG. 4 illustrates an example of an operating environment 400 such as may be representative of some embodiments. More specifically, operating environment 400 may include a VM environment implemented using an S-IOV architecture. FIG. 4 illustrates processor 405, which may represent an embodiment of processor 312 in FIG. 3 or an execution core of a multicore processor embodiment of processor 312 in FIG. 3. Processor 405 may include a storage unit 410, an instruction unit 420, an execution unit 430, a control unit 440, and/or a memory management unit (MMU) 450. Processor 405 may also include any other circuitry, structures, or logic not shown in FIG. 3.

Storage unit 410 may include any combination of any type of storage usable for any purpose within processor 405. For example, storage unit 410 may include any number of readable, writable, and/or read-writable registers, buffers, and/or caches, implemented using any memory or storage technology, in which to store capability information, configuration information, control information, status information, performance information, instructions, data, and any other information usable in the operation of processor 405, as well as circuitry usable to access such storage and/or to cause or support various operations and/or configurations associated with access to such storage.

Instruction unit 420 may include any circuitry, logic, structures, and/or other hardware, such as an instruction decoder, to fetch, receive, decode, interpret, schedule, and/or handle instructions to be executed by processor 405. Any instruction format may be used within the scope of the present disclosure; for example, an instruction may include an opcode and one or more operands, where the opcode may be decoded into one or more micro-instructions or micro-operations for execution by execution unit 430. Operands or other parameters may be associated with an instruction implicitly, directly, indirectly, or according to any other approach.

Execution unit 430 may include any circuitry, logic, structures, and/or other hardware, such as arithmetic units, logic units, floating point units, shifters, etc., to process data and execute instructions, micro-instructions, and/or micro-operations. Execution unit 430 may represent any one or more physically or logically distinct execution units. Control unit 440 may include any microcode, firmware, circuitry, logic, structures, and/or hardware to control the operation of the units and other elements of processor 405 and the transfer of data within, into, and out of processor 405. Control unit 440 may cause processor 405 to perform or participate in the performance of processes according to some embodiment, for example, by causing processor 405, using execution unit 430 and/or any other resources, to execute instructions received by instruction unit 420 and micro-instructions or micro-operations derived from instructions received by instruction unit 420. The execution of instructions by execution unit 430 may vary based on control and/or configuration information stored in storage unit 410.

MMU 450 may include any circuitry, logic, structures, and/or other hardware to manage system memory, such as providing for the virtualization of physical memory according to any desired approach and the protection of system memory. In an embodiment, MMU 450 may support the use of virtual memory to provide software, including software running in a VM, with an address space for storing and accessing code and data that is larger than the address space of the physical memory in the system, for instance, system memory 320. The virtual memory space of processor 405 may be limited only by the number of address bits available to software running on the processor, while the physical memory space of processor 405 may be limited to the size of system memory 320. MMU 450 supports a memory management scheme, such as paging, to swap the executing software's code and data in and out of system memory 320 on an as-needed basis. As part of this scheme, the software may access the virtual memory space of the processor with an un-translated address that is translated by the processor to a translated address that the processor may use to access the physical memory space of the processor.

Accordingly, MMU 450 may include translation lookaside buffer 452 in which to store translations of a virtual, logical, linear, or other un-translated address to a physical or other translated address, according to any known memory management technique, such as paging. To perform these address translations, MMU 450 may include page-walk hardware 454 to refer to one or more data structures stored in processor 405, system memory 320, storage locations in system 305 not shown in FIG. 3, and/or any combination thereof. These data structures may include page directories, page tables, and other paging data structures according to any known paging architecture. Each such paging data structure, as well as TLB 452, may include (or have associated with individual or groups of entries) one or more bits or other indicators to be used to indicate and enforce various permissions (e.g., read, write, or execute) that may define or restrict access to pages (or other regions) of memory.

The virtualization capabilities of a processor along with MMU 450 may provide for various approaches to creating and maintaining containers, where a container may be any execution or processing environment, created and maintained by a hypervisor, VMM, OS, or any other system or host software. Any platform, system, or machine, including the "bare metal" platform shown as system 305 in FIG. 3, as well as any VM or other container abstracted from a bare metal platform, from which one or more containers are abstracted may be referred to as a host or host machine, and each VM or other such container abstracted from a host machine may be referred to as a guest or guest machine. Accordingly, the term "host software" may generally refer to any hypervisor, VMM, OS, or any other software that may run, execute, or otherwise operate on a host machine and create, maintain, and/or otherwise manage one or more containers. The term "guest software" may generally refer to any OS, system, application, user, or other software that may run, execute, or otherwise operate on a guest machine. Note that in a layered container architecture, software may be both host software and guest software. For example, a first VMM running on a bare metal platform may create a first VM, in which a second VMM may run and create a second VM abstracted from the first VM, in which case the second VMM is both host software and guest software.

For convenience, the use of the term "container process" may mean any context, task, application, software, privileged process, unprivileged process, kernel-mode process, supervisor-mode process, user-mode process, or any other process running or runnable within a container. A container may have an address space (a container address space or a guest address space) that is different from the system address space (for example, the address space of system memory 320) or the host address space (for example, the address space of the host machine). An address with which the system address space may be directly accessed (for instance, without translation) may be referred to as a host physical address (HPA). For isolation, protection, or any other purpose, any container address space may be different from any other container address space. Therefore, each container process may access memory using addresses that are to be translated, filtered, or otherwise processed to HPAs differently than they are translated, filtered, or otherwise processed for any other container. The difference in translation/processing of container addresses may be due to virtualization and isolation of container address spaces (e.g., guest software may use guest virtual addresses (GVAs) that are translated to guest physical address spaces (GPAs) that are translated to HPAs) and may also be due to the use of a variety of different types of containers (e.g., VMs, OS-managed containers, etc.) and/or different container architectures (e.g., layered architectures including VMs hosting multiple VMs, VMs hosting multiple OS-managed containers, etc.).

An address used by a container process to access memory (a container address) may be any of many different types of addresses, including an HPA, a virtual address, a guest physical address (GPA), a guest virtual address (GVA), a DMA address, etc., and may go through one or more of any of a variety of techniques, types, levels, layers, rounds, and/or steps of translation, filtering, and/or processing, in any combination, using any of a variety of data structures (e.g., page tables, extended page tables, nested page tables, DMA translation tables, memory access filters, memory type filters, memory permission filters, etc.) to result in an HPA and/or in a fault, error, or any other type of determination that a requested access is not allowed. Various approaches may include layering and/or nesting of containers (e.g., a VMM hosting a VM running a guest OS, the guest OS supporting multiple containers; a VMM hosting multiple VMs each running a guest OS, etc.), involving various combinations of address translation techniques.

Each PF within an I/O device in system 305 may become usable and/or shareable by one or more clients (for example, containers, container processes, host processes, and/or the like) by reporting to system software the number of command interfaces ("assignable interfaces" (AIs) or "command portals") that it supports, where a command interface is an interface through which a client (for example, a VM or VMM) may communicate with an I/O device. In various embodiments, a client may use a command interface to submit a work request to the I/O device (for example, through a portal driver). In an embodiment in which the virtualized computing device operates in an S-IOV architecture, the command interface may include an AI. For instance, an AI for a NIC (for example, NIC 346) may be a paired transmit queue and receive queue. An AI for an InfiniBand, remote DMA (RDMA), or other host fabric controller (for example, host fabric controller 316) may be a Queue Pair. An AI for a Non-Volatile Memory Express (NVMe) or other storage device controller (for example, storage device controller 349) may be a Command Queue. An AI for a graphics processing unit (GPU), general purpose computing on GPU (GPGPU), or other accelerator (for example, hardware accelerator 350) may be a schedulable context through which work may be submitted. An AI may be distinguished from an "admin portal" as being an interface for a client to submit work, whereas an admin portal is an interface through which a container host sets up or configures the AIs.

An I/O device may report to host software that it supports one or more AIs for use according to embodiments of the present specification, as well as how many AIs it supports, through capability/attribute information that it provides according to a system bus or interconnect specification (for example, through a new capability added to the Peripheral Component Interconnect Express (PCIe) specification), by a device driver for the physical function, or according to any other known technique for reporting physical function capabilities/attributes.

In some embodiments, host software may use the I/O device's admin portal to allocate, map, and/or assign each AI to a client. This assignment includes assigning a process address space identifier (PASID) to the AI, where the PASID corresponds to the address space associated with the client. In an embodiment, a PASID may be a 20-bit tag defined by the PCIe specification and carried by the translation layer packet (TLP) prefix header in transactions generated by the I/O device. After the assignment and configuration of an AI has been completed, clients may submit work requests to the AI according to some embodiments.

In some embodiments, an S-IOV architecture, such as depicted in FIGS. 3 and 4, may include an I/O device configured to implement an AI as a light-weight version of a VF. AIs may lack certain functionality or elements associated with a VF. For instance, an AI may lack a PCI configuration space, VF base address registers (BARs), and/or an MSI-X table. In various embodiments, an AI may implement one or more pages of MMIO registers (for example, 4 KB pages of MMIO registers) that are part of the main device (PF) BARs. In some embodiments, each AI may correspond to an individual resource (for instance, queue, context, and/or the like) and may implement the minimal MMIO interface to configure and operate the respective backend resource. AI access from a guest driver may include various types or categories of accesses. Non-limiting examples of AI accesses may include control path accesses (generally infrequent accesses and, therefore, not performance critical) and fast path accesses (frequent data path accesses and, therefore, performance critical). An AI control path and fast path MMIO registers may be configured in different memory pages (for example, different 4 KB pages) so that fast path registers may be mapped into the VM for direct access while control path registers may be emulated in software.

In conventional virtualized computing environments, CPU elements (the "CPU side") may have certain support functions and/or elements to facilitate migration and/or deployment that is lacking for devices (the "device side"). For example, to facilitate migration and/or deployment compatibility, the CPU side may use CPUID and/or CPUID virtualization to enumerate and hide CPU capabilities exposed to VMs. Such functionality may allow a VMM to create a pool of live migration compatible severs for a VM. However, no such architecture or functionality exists on the device side to enumerate device capabilities and to expose subsets to VMs. Accordingly, device compatibility issues exist for some VF drivers to work across different generations of devices. In another example, to facilitate memory state migration, the CPU side of conventional systems may include A/D bit support in EPT page-tables to, for instance, enable a VMM to track and/or migrate only modified pages during phases of VM memory migration. Nonetheless, conventional systems lack A/D support on the device side, for instance, A/D support in IOMMU second-level page tables. Accordingly, VM pages modified by assigned VFs cannot be detected. In a further example, to facilitate device state migration, the CPU side of conventional systems may include functionality for a VMM to stop and/or suspend a VCPU, save the VCPU state, and restore the VCPU state on a physical CPU of a target physical machine. However, the device side of conventional systems does not include corresponding functionality, for instance, PF driver interfaces configured to stop and/or suspend a VF, save VF states, and restore VF states on a target physical machine. Accordingly, VMMs operating in conventional systems typically disable live migration, for instance, of VM assigned devices.

As described above, devices, such as SR-IOV devices, may be virtualized by the VMM assigning VFs directly to the VMs. A VF PCI configuration is typically virtualized by the VMM, but the MMIO BARs are mapped directly into the VM. Although the VMM may virtualize (for instance, hide or expose) PCI capabilities, the VMM cannot hide or expose VF device-specific capabilities (for example, exposed through the MMIO space) to the VM. Accordingly, deployment and/or migration issues arise between the VF driver and multiple generations of SR-IOV devices in the data center. The VF driver may directly access and program corresponding VF MMIO space without any further VMM involvement. Accordingly, it is more complex to migrate the VDEV state to a target VF during live VM migration since the VF contains all of the VDEV MMIO states. In addition, if a device supports PRS and/or SVM, there may be additional states in the VF that need to be migrated, adding to the existing complexity of migration. Certain conventional techniques, for instance, involving SR-IOV NIC devices, involve the VMM removing a NIC VF from the VM and switching the VM NIC to emulation on a source physical machine (and performing the reverse operation on the target physical machine). However, such techniques depend on packets that are lost during migration being treated as naturally lost packets that may be recovered, for instance, by software. However, these techniques are not generally applicable to a wide range of devices and, in particular, do not work for devices that lack software for handling lost packets.

Accordingly, some embodiments provide for VM deployment and/or migration compatibility processes generally applicable to various devices. In various embodiments, VM and/or VDEV deployment and/or migration may be achieved using a virtual environment in which a device may expose its device-specific capabilities. In some embodiments, the virtual environment may include an SR-IOV architecture, an S-IOV architecture, a combination thereof, and/or the like. In various embodiments, a device may expose its device specific capabilities through the MMIO space, for instance, that may be enumerated by a driver. In some embodiments, the driver may implement software interfaces to support VMM querying of the device-specific capabilities. Accordingly, a VMM may expose only a subset of device-specific capabilities to the VM which may be supported by multiple generations of an I/O device. In this manner, a DCRM or similar element may operate to create a pool of compatible servers with devices (such as S-IOV devices) in which a VM image may be deployed and/or migrated.

In various embodiments, for performance-critical device states (for instance, VDEV states) an I/O device may implement device-specific interfaces to stop and/or suspend various elements and/or processes such as VFs and/or AIs. For example, for performance-critical VDEV states (for instance, an AI state that is in an I/O device), the I/O device may implement device-specific interfaces to stop/suspend the AIs, save AI states, and restore AI states on a target AI, device, and/or the like. In a computing environment in which a device supports PRS, for example, to facilitate SVM, some embodiments may operate to suspend VCPUs and/or VFs without affecting PRS handling. In some embodiments, a host driver may be configured to implement software interfaces for a VMM to request these operations (for instance, suspend, save, restore, and/or the like). Therefore, systems operating according to some embodiments may efficiently migrate VDEV state during VM migration, for instance, by saving AI states, migrating AI states along with non-performance critical states (which may already be managed by a VDCM), and restoring VDEV state on the destination AIs. In various embodiments, A/D bit support may be employed for migrating VM memory state, for example, in the IOMMU second-level address translation table.

Accordingly, some embodiments may facilitate compatibility during deployment and/or migration of isolated domains (for instance, VMs, containers, and/or the like), such as via locating a compatible physical machine on which to start the domain and/or migrate a running domain in a data center environment. In addition, various embodiments may be configured to efficiently and accurately migrate domain memory state during live domain migration. Furthermore, some embodiments may be configured to efficiently and accurately migrate device state during domain migration, for example, where the domain has direct access to accelerators and/or high-performance I/O devices, such as GPU, FPGA, Cryptographic/Compression accelerators, Omnipath NICs, 100G Ethernet NICs/RDMA, and/or the like.

Although SR-IOV and S-IOV systems may be used in the described examples, embodiments are not so limited, as any type of virtualized computing environment capable of operating according to some embodiments is contemplated herein. In addition, embodiments are not limited to operating using VMs, VFs, AIs, containers, and/or the like described in various examples, as any type of domain or virtualized element capable of operating according to some embodiments is contemplated herein. Embodiments are not limited in this context.

Figure 5:
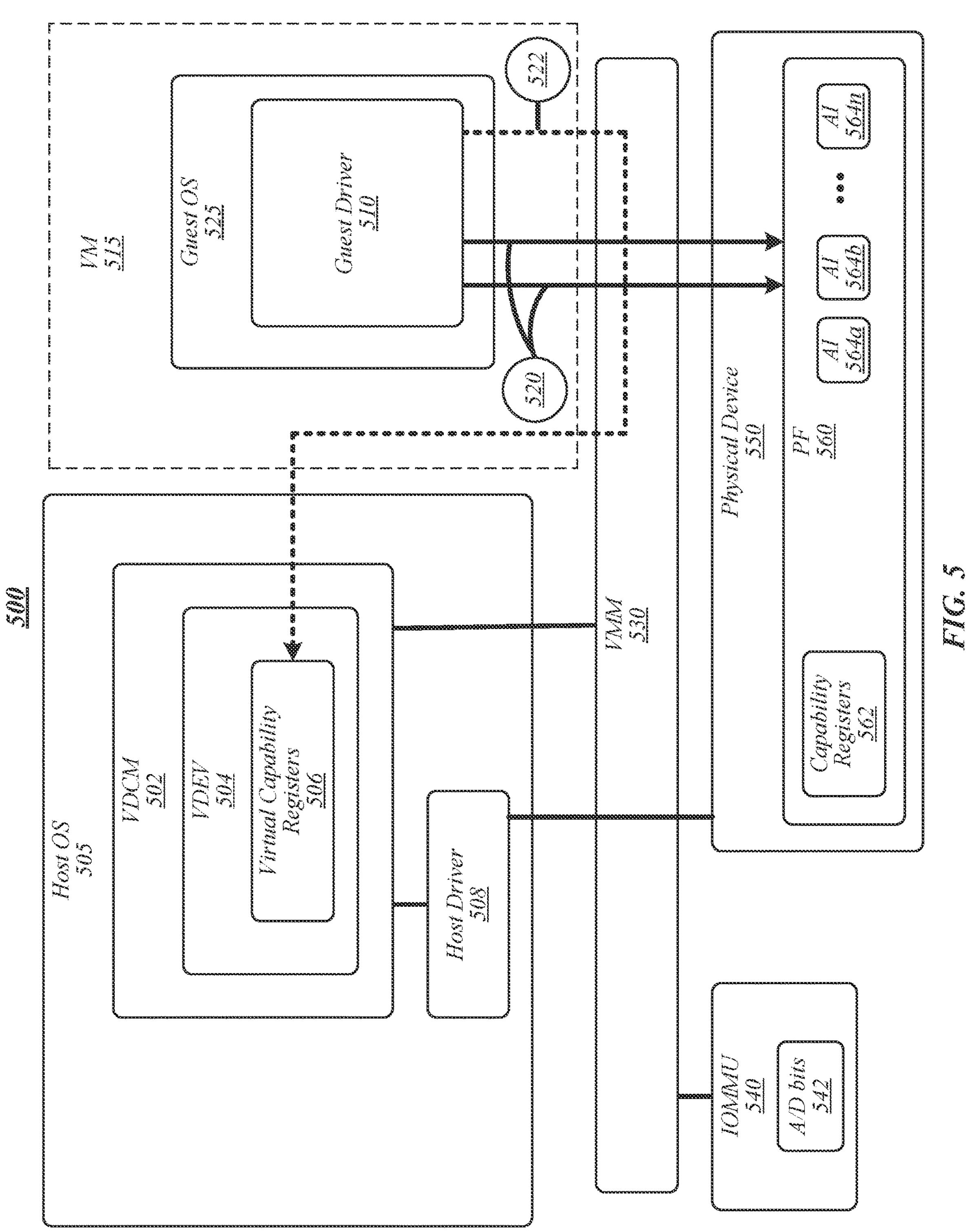
FIG. 5 illustrates an embodiment of a fifth operating environment.

FIG. 5 illustrates an example of an operating environment 500 such as may be representative of some embodiments. More specifically, operating environment 500 may include a virtualized computing environment implemented according to some embodiments, such as one of operating environments 100, 200, 300, and/or 400. In some embodiments, operating environment 500 may include an S-IOV architecture. In some embodiments, operating environment 500 may include a type-1 VMM architecture.

As shown in FIG. 5, operating environment 500 may include a host OS 505, a VM 515 having a guest OS 525, a VMM 530, an IOMMU 540, and/or a physical device 550. Host OS 505 may include a host driver 508 and guest OS 525 may include a guest driver 510. In some embodiments, host driver 508 may operate similar to an SR-IOV PF driver, and guest driver 510 may operate similar to an SR-IOV VF driver. In various embodiments, host OS 505 may include a VDCM 502 for a VDEV 504. In some embodiments, VDEV may include virtual capability registers 506 configured to expose device (or "device-specific") capabilities to one or more components of operating environment 500. In various embodiments, virtual capability registers 506 may be accessed by guest driver 510 of a physical device 550 to determine device capabilities associated with VDEV 504. In some embodiments, one or more AIs 564*a-n* may be assigned, for instance, by mapping the AIs 564*a-n* into a VDEV MMIO space. Operating environment 500 may include an IOMMU 540 configured, for instance, to provide A/D bit support according to some embodiments. As shown in FIG. 5, a (slow) control path 522 may be arranged between guest driver 510 and virtual capability registers 506 and a (fast) data path 520 may be arranged between guest driver 510 and PF 560 operative on physical device 550.

In various embodiments, VMM 530 may determine a compatibility between guest driver 510 in a VM image and a physical device 550 (for instance, a target I/O device). In some embodiments, physical device 550 may implement capability registers 562, for instance, in a PF 560. In various embodiments, capability registers 562 may include MMIO capability registers. In some embodiments, capability registers 562 may be configured to expose device-specific capabilities of physical device 550 to host driver 508. In some embodiments, VDCM 502 may virtualize capability registers 562 in VDEV 504 as virtual capability registers 506 configured to expose VDEV capabilities to guest driver 510. Accordingly, VMM 530 may control which device-specific capabilities of capability registers 562 may be exposed to the VM 515 (for instance, guest driver 510). In this manner, VMM 530 may determine a subset of device-specific capabilities (a "capability subset") depending on, for instance, which generations of physical devices VMM is supporting. For example, if VMM 530 is supporting generations N−1, N, and N+1 of I/O devices in a data center, VMM may select to expose a capability subset comprising device-specific capabilities that are present on the three generations of I/O devices (for instance, N−1, N, and N+1). Consequently, the same VM image (for instance, with guest driver 510) may be deployed on and/or migrated to any target physical machine containing any three of the I/O device generations (for instance, N−1, N, and N+1).

In some embodiments, VDCM 502 may emulate non-performance critical capabilities. For example, VDCM 502 may emulate non-performance critical capabilities in software for certain generations of I/O devices having capabilities that are not implemented in hardware. Accordingly, device-specific capabilities in a capability subset may be increased to include additional values delivered to guest VMs without affecting their performance. In this manner, a VMM 530 configured according to some embodiments may enumerate and/or hide incompatible device-specific capabilities of multiple generations of I/O devices to VM 515. In various embodiments, guest driver 510 may query for the capabilities of physical device 550, for instance, located in capability registers 562. In some embodiments, guest driver 510 may query for the capabilities of physical device 550 via VDCM. In some embodiments, guest driver 510 may query for the capabilities of physical device 550 after VM migration. Accordingly, guest driver 510 may adapt to changes in device-specific capabilities of physical device 550.

In various embodiments, VM memory migration may be handled via A/D bits 542 in IOMMU 540. In some embodiments, A/D bit support may be associated with IOMMU 540 second-level address translation tables (for instance, DMA remapping page tables). In various embodiments, A/D bits 542 may be updated automatically by DMA remapping hardware page-walks, for example, allowing CPU MMUs and/or DMA remapping hardware to share a common set of page-tables. In this manner, VMM 530 may use A/D bits 542 in virtualization page-tables to detect dirtied pages due to writes from both guest OS 525 software and/or assigned devices, such as VFs and/or AIs.

To implement VM migration supporting migration of VDEV state, a physical device 550 configured according to some embodiments may implement interfaces for VMM 530 to request various migration processes and/or process steps. Non-limiting examples of such migration process steps may include, requesting AI suspend, waiting for AI suspend complete, requesting AI restore, and/or waiting for AI restore complete. In some embodiments, VMM 530 may provide an AI (or command interface) suspend request message or signal and/or an AI restore request message or signal. In various embodiments, VMM 530 may receive an AI suspend complete message or signal from physical device 550 responsive to an AI being suspended (for instance, an AI specified in the AI suspend request message). In some embodiments, VMM 530 may receive an AI restore complete message from physical device responsive to completion of an AI restore process (for instance, of an AI specified in an AI restore message).

In some embodiments, physical device 550 may generate a migration status element that includes migration state information associated with VM 515. In some embodiments, a migration status element may include an AI migration state that includes, for instance, all of the AI state information required to resume a new AI to the same operational state as the original AI 564*a-n*. In some embodiments, host driver 508 may save and restore the AI migration state to/from the AI 564*a-n*. In some embodiments, physical device 550 and host driver 508 may implement interfaces using various processes and/or elements, including, without limitation, memory registers (for instance, MMIO registers), I/O commands, host memory, and/or the like.

Various embodiments may be configured to handle outstanding I/O commands during VM deployment and/or migration. For instance, during the last phase of live migration, when VM 515 is suspended, VM 515 may have outstanding I/O commands in physical deice 550. Handling of such outstanding I/O commands may be device specific and may be abstracted from VMM 530 using various interfaces, such as an AI suspend interface, an AI migration state interface, and/or an AI restore interface. For example, in some embodiments, physical device 550 may wait for all outstanding I/O commands from VM 515 to complete during an AI suspend process. Accordingly, an AI migration state process may not contain outstanding I/O commands. In this manner, an AI restore process associated with VM 515 may be simpler and more efficient. In another example, physical device 550 may wait to complete only outstanding I/O commands that are already in a processing pipeline of physical device 550 during an AI suspend process. For instance, physical device 550 may include the queued I/O commands (for example, that are still waiting to be processed) in an AI (or command interface) migration state process or element (for example, an information element). Accordingly, host driver 508 may save the outstanding I/O commands as part of an AI migration state process or element and migrate them to the target physical machine. In some embodiments, an AI restore process on the target physical device may re-issue the outstanding I/O commands in the AI migration state process or element to the newly assigned AIs 564*a-n* such that the outstanding I/O commands may be processed on the target physical device post-migration. In this manner, an AI suspend process may finish faster, thereby reducing downtime for VM 515 during a live migration process.

In various embodiments, physical device 550 may support PRS and/or SVM and, therefore, physical device 550 may generate PRS requests during processing of I/O commands.

In a conventional system, if a page fault is in the first-level page table, PRS handling may need to be handled by the VM. Since a VMM stops the VM (for instance, VCPUs) before issuing an AI suspend message, any PRS requests during processing of outstanding I/O commands that require handling by the guest VM cannot be processed. If the VMM resumes the VCPUs to handle the PRS, the VM may submit more outstanding I/O commands which in turn may generate more PRS requests. Accordingly, in a conventional system, AI suspend processes may take arbitrarily long to complete and, therefore, essentially prevent live VM migration.

Accordingly, in some embodiments in which physical device 550 supports PSR and/or SVM, when physical device 550 encounters an I/O page fault and needs to perform PRS for an AI in an AI suspend process, physical device 550 may save the execution state of the corresponding I/O command as part of an AI migration state process or element and provide to the VMM 530 via host driver 508. In this manner, the I/O command may be migrated to the target physical machine in the AI migration state process or element. On the target physical machine, host driver 508 may re-issue saved I/O commands to new AIs 564*a-c* as part of the AI restore process. Host driver 508 may resume AI operation while VMM 530 may resume VCPUs of VM 515, and physical device 550 may send PRS requests to VMM 530.

In various embodiments in which physical device 550 supports PRS and/or SVM, physical device 550 may send PRS requests for an AI 564*a-n* to VMM 530 even when the AI suspend process has started. VMM 530 may determine if VMM 530 should handle the PRS request or forward the PRS request to VM 515. In various embodiments, VMM 530 may determine whether to handle the PRS request using the PASID and address in the PRS and walking the first-level page table. For example, if nested translation is not set up for this PASID, or if the fault is not in the first-level page table, VMM 530 may handle the PRS request and return a response. In another example, if nested translation is set for the PASID and the fault is in the first-level page table, the PRS request may be forwarded or otherwise provided to VM 515 for further handling.

In various embodiments, if the PRS request is provided to VM 515 for further handling, VMM 530 may unmap fast path registers of assigned devices of VM 515 so that any fast path access (for instance, including work submissions) from VM 515 may cause a VM exit to VDCM instead of going directly to the physical device 550. The VCPU that the PRS interrupt is directed to may be resumed. In some embodiments, VMM 530 may also resume other VCPUS, either immediately and/or if/when the running VCPU sends an IPI (inter processor interrupt) to another VCPU. If VM 515 exits due to work submissions occurring before the AI suspend process completes, work commands to the AI may be queued within the VDCM. Once the AI suspend process completes, VCPUS may be suspended (or suspended again). The queued work commands may be included as part of the AI migration state element sent to the target physical machine.

In a conventional SR-IOV architecture, each VF may be allocated device-specific backend resources (for instance, backend resources 272*a-n* in FIG. 2). VF MMIO space is mapped to the backend resources for the VF to function. As the VF driver directly accesses the VF MMIO space without VMM involvement, an SR-IOV device must implement mapping from the VF MMIO space to the backend resources. Certain SR-IOV devices may avoid static mapping between VFs and backend resources. Such SR-IOV devices may implement complex re-mapping logic (for instance, device resource remapping logic 270 of FIG. 2) so that the VMM may dynamically map or allocate backend resources to VFs, for example, just before assigning VFs to VMs. However, implementing such resource management logic in an I/O device increases the cost and complexity of the SR-IOV device. Accordingly, typical I/O devices avoid implementing fine-grained resource management on the I/O device in order to reduce cost and complexity of the device. For example, an I/O device may operate by statically allocating backend resources, such as queues, to a VF in sets of a certain size (such as sets of 4) instead of at one queue granularity. In another example, an I/O device may not allow changing VF resources if the VF is reassigned to a different VM.

A VMM cannot overcommit backend resources to VMs because VF drivers are able to directly access the VF MMIO space without VMM involvement. Accordingly, if VF1 is assigned to VM1, VF1's backend resources cannot be reassigned to VM2 while VM1 is still running. However, it may be desirable to reassign VF1 to VM2, for instance, based on VM resource requirements. Non-limiting examples of resource requirements may include idle status, process requirements (for instance, certain high-performance processes, such as high-performance VF processes), resource requirements, resource priority, and/or the like.

For example, it may be desirable to reassign VF1 to VM2 if VM1 is idle, doesn't need certain processes, such as high-performance VF processes, has a lower resource requirement than VM2, and/or the like. Accordingly, the inability to overcommit an SR-IOV device to VMs severely reduces the flexibility and efficiency of device resource management in conventional SR-IOV architectures.

With existing SR-IOV devices, over-committing memory of VMs with assigned devices is substantially limited, for instance, as conventional approaches of memory over-commit do not work for certain processes, such as DMA accesses (for example, that assumes pinned memory) to VMs. Such illustrative conventional approaches may include copy-on-write or VMM paging techniques. Existing solutions may either disable memory overcommit for VMs with assigned devices or attempt to operate using alternate approaches (for instance, guest memory ballooning) that are not applicable or inefficient for hyper-scale and/or high-density usages.

Certain SR-IOV devices, for instance SVM-capable devices, may support recoverable I/O page faults for DMA through the use of PCIe standard defined PRS capability and suitable DMA remapping hardware support. However, even when a device supports PRS, conventional implementations of PRS do not require the device to support recoverable page faults on all DMA access. Rather, the device and the corresponding driver may together decide which device DMA accesses can recover from page-faults. Accordingly, using PRS capabilities transparently by the VMM (for instance, without device-specific involvement) for demand paging is impractical if not impossible for conventional PRS-capable devices. As such, the inability to overcommit memory to VMs reduces memory management flexibility in VMMs for existing SR-IOV architecture systems.

In conventional SR-IOV systems, software architecture allows for a single VDEV to include a single VF as VF MMIO space is designed to support a single VDEV and VF drivers directly accessing the VF MMIO space. However, under certain usage conditions, it may be more efficient and effective for a VMM to assign multiple VFs from multiple SR-IOV devices to the VM using a single VDEV. In addition, a VMM may achieve flexibility to compose "heterogeneous" VDEVs from multiple heterogeneous physical devices. For example, a VM may require a certain number of queues for its VDEV, however the corresponding SR-IOV device cannot allocate the required number of queues to the VF because of a lack of available queues on the device. In a "heterogeneous" system, for instance, an independent hardware vendor (IHV) that develops both a NIC and an FPGA device may seek to create a virtual NIC with an on-board FPGA device for network acceleration usages instead of actually building such a physical device. However, architecture and/or software of conventional SR-IOV systems does not provide for the flexibility of creating a single VDEV that consists of more than one VF, either from the same SR-IOV device or from multiple (and potentially heterogeneous) SR-IOV devices.

Accordingly, in some embodiments, an I/O device and/or VMMs may be configured such that the VMMs may emulate to provide resource management functionalities that overcome the deficiencies of conventional SR-IOV systems, such as mapping VDEVs directly to device backend resources, emulating MMIO interfaces to implement VMM memory overcommit, dynamically mapping VDEV paths (for instance, fast paths) between emulation and direct access to implement device overcommit, and/or composing a VDEV from AIs on multiple I/O devices.

Figure 6:
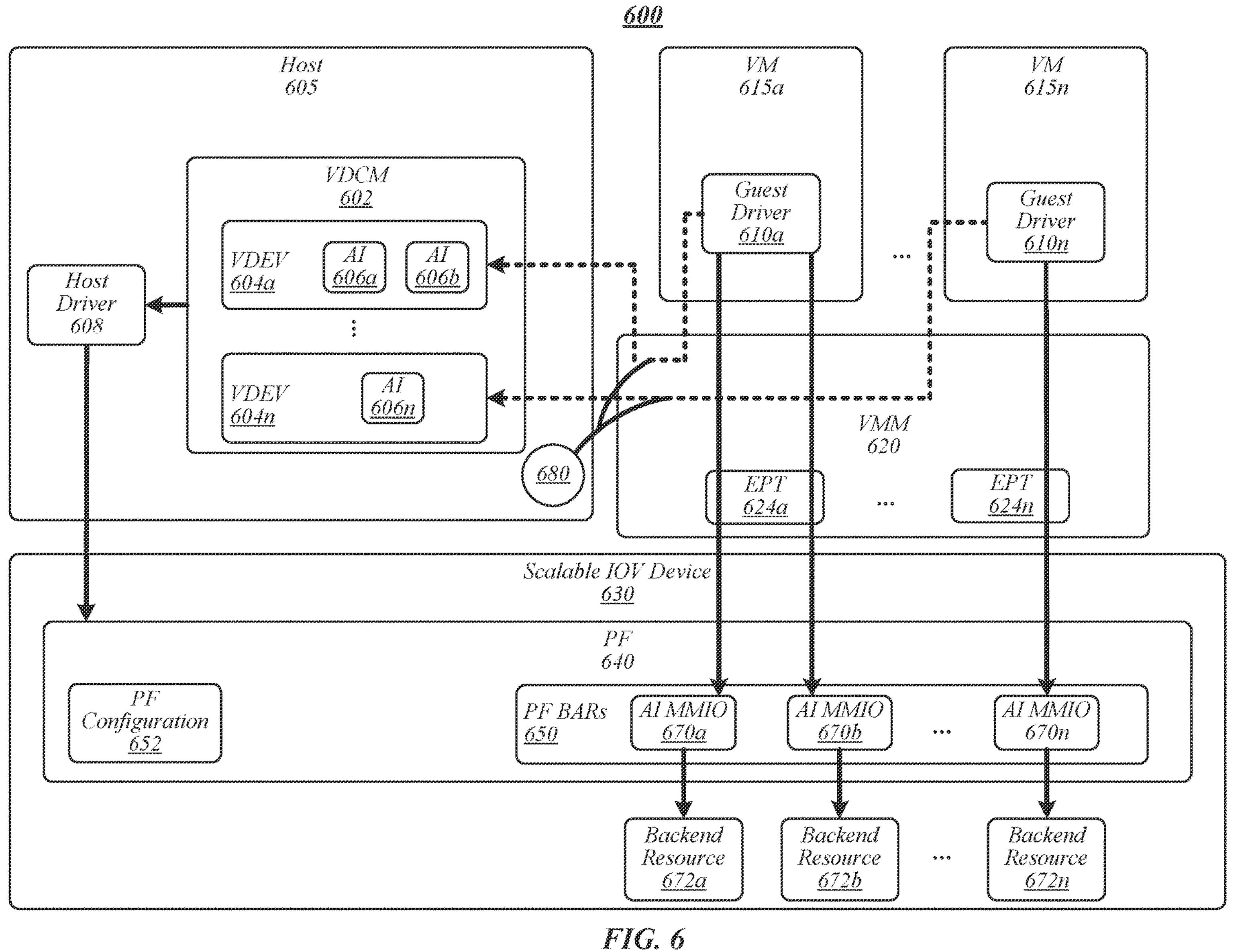
FIG. 6 illustrates an embodiment of a sixth operating environment.

FIG. 6 illustrates an example of an operating environment 600 such as may be representative of some embodiments. More specifically, operating environment 600 may include a virtualized computing environment implemented according to some embodiments, such as one of operating environments 100, 200, 300, 400, and/or 500. In some embodiments, operating environment 600 may include an S-IOV architecture. In some embodiments, operating environment 600 may include a type-1 VMM architecture.

As shown in FIG. 6, operating environment 600 may include a host 605 having a host driver 608 and VMs 615*a-n* having guest drivers 610*a-n*. AN S-IOV device 630 may include a PF having a PF BAR space 650 and/or a PF configuration space 652. As opposed to the SR-IOV device 230 of FIG. 2, having VFs 232*a-n* with VF BAR spaces 260*a-n* and VF configuration spaces 262*a-n*, S-IOV device 630 may include a PF 640 implementing AI MMIO (or command interface MMIO) spaces 670*a-n*, for instance, as part of PF BARs 650. In some embodiments, VF BAR spaces 260*a-n* and VF configuration spaces 262*a-n* may be incorporated in VDCM 602, for example, which may emulate VF BAR spaces 260*a-n* and VF configuration spaces 262*a-n* in software. For example, VDCM 602 may emulate VDEVs 604*a-n* which are each assigned to a VM 615*a-n*. In various embodiments, AIs 606*a-n* may be assigned to a VM 615*a-n*, for instance, by mapping AIs 606*a-n* into the VDEV 604*a-n* MMIO space.

Guest drivers 610*a-n* may access VDEV 604*a-n* MMIO space to operate S-IOV device 630 functions. VDEV 604*a-n* fast-path MMIO registers may be directly mapped to the AI MMIO 670*a-n* registers, for instance, so that guest drivers 610*a-n* may directly access AI MMIOs 670*a-n* without any virtualization overhead. VDEVs 604*a-n* control path MMIO registers may be unmapped so that guest drivers 610*a-n* accesses of the control path MMIO registers may generate a trap into VMM 620 (for instance, as represented by lines 680), which may be forwarded to VDCM 602 for emulation.

In some embodiments, the MMIO space of S-IOV device 630 may be configured such that each backend resource 672*a-n* may be mapped to an AI MMIO 670*a-n*, for instance, to remove the resource remapping logic from S-IOV device 630 (for example, device resource remapping logic 270 of SR-IOV device 230). Each of AI MMIO 670*a-n* may be mapped to a backend resource 672*a-n*, such as a backend queue. For instance, if S-IOV device 630 implements 2000 backend queues, the MMIO space of S-IOV device 630 may be configured to support 2000 AI MMIOs 670*a-n*, each mapping to a corresponding backend queue.

In various embodiments, implementation of VDEVs 604*a-n* by VDCM 602 and operating with each AI MMIO 670*a-n* corresponding to a backend resource, resource mapping may be performed by VDCM 602. In some embodiments, VDCM 602 may assign a desired number of backend resources 672*a-n* to VMs 615*a-n* by allocating an equivalent number of AIs 606*a-n* to VDEVs 604*a-n*. Allocated AI MMIO 670*a-n* fast path registers may be mapped directly into VMs 615*a-n* using the CPUs second-level translation table, for instance, EPTs 624*a-n*. Accordingly, instead of using the resource remapping logic from S-IOV device 630 (for example, device resource remapping logic 270 of SR-IOV device 230), VDCM 602 may use EPTs 624*a-n* to dynamically map desired backend resources 672*a-n* to VMs 615*a-n*. In addition, VMM 620 may have better control over managing S-IOV device resources, such as backend resources 672*a-n*. For example, VMM 620 may now assign device resources to VMs 615*a-n* at much finer granularity without increasing device complexity. More specifically, as VDEV 602 is a software component, VMM 620 may dynamically create VDEVs 604*a-n* with arbitrary resource management.

In some embodiments, a PRS-enabled S-IOV device 630 may include architecture, such as software architecture, that enables host drivers to enumerate or indicate a page-fault status of an AI 606*a-n*. In some embodiments, a page-fault status may include whether an AI 606*a-n* is page-fault capable, such as being fully page-fault capable, partially page-fault capable, not page-fault capable, or the like (for instance, if all DMA accesses from AI 606*a-n* to system software managed memory are capable of recoverable page-faults). If AIs 606*a-n* are page-fault capable, VMM 620 may support full memory over-commit for VMs 615*a-n* with virtual devices backed by page-fault capable AIs 606*a-n*. Host driver 608 may enumerate the full page-fault handling capability using one or more device-specific techniques according to some embodiments, such as using an MMIO capability register.

In various embodiments, AIs 606*a-n* may only be partially page-fault capable. For example, a portion of DMA accesses generated by AIs 606*a-n* may not be page-fault capable, while another portion may be page-fault capable (for instance, a vast majority may be page-fault capable). For partially page-fault capable AIs 606*a-n*, VDEV 604*a-n* MMIO interface may be defined to require explicit indication/registration of such pages by guest drivers 610*a-n*. In this manner, VDCM 602 may be enabled to intercept and detect such "pinned" guest pages and ensure that they are also pinned by VMM 620 in EPTs 624*a-n*. An example of such usage may include a graphics S-IOV device in which a small subset of pages may need to be pinned in memory and can be required to be explicitly registered, for instance, using a graphics translation table (for instance, virtualized in software to reflect the pinning to VMM virtualization page-tables), but the vast majority of the guest pages can be demand-paged by the VMM as device accesses to such pages may be subject to recoverable page-faults.

In various embodiments, VMM 620 may overcommit AIs 606*a-n* to VMs 615*a-n* using VDCM 602. For example, VDCM 602 may use EPTs 624*a-n* to map AIs 606*a-n* to VMs 615*a-n*. VDCM 602 may dynamically map/unmap AI MMIOs 670*a-n* in VMs 615*a-n*. In this manner, VDCM 602 may be able to dynamically assign/reassign (or "steal") AIs 606*a-n* from one VDEV 606*a-n* and allocate such AIs 606*a-n* to another VDEV 606*a-n* without VMs 615*a-n* knowledge. In various embodiments, a VDEV 604*a-n* losing an AI 606*a-n* (for instance, a "victim VDEV") fast-path MMIO may be dynamically switched from direct-mapped to "trap-and-emulate' similar to the control path MMIO of such a VDEV 604*a-n*. Accordingly, AIs 606*a-n* of victim VDEV 604*a-n* may be fully emulated in software by VDCM 602. In this manner, VMM 620 may operate with the flexibility to overcommit S-IOV device 630 to VMs 615*a-n* by dynamically allocating AIs to active or higher-priority VMs and freeing AIs 606*a-n* from inactive or lower-priority VMs.

In some embodiments, VDCM 602 may map multiple AIs 606*a-n* from multiple S-IOV devices 630 to a VM 615*a-n* as a single VDEV 604*a-n* to generate a VDEV 604*a-n* that is composed of AIs 606*a-n* from multiple S-IOV devices 630. In some embodiments, such multiple S-IOV devices 630 may include devices that are the same make, model, and/or generation. Guest drivers 610*a-n* may access all AIs 606*a-n* through VDEV 604*a-n* MMIO space. In various embodiments, AIs 606*a-n* may belong to the same type of S-IOV device ("homogeneous VDEV"). In various embodiments, AIs 606*a-n* may belong to different types of S-IOV device ("heterogeneous VDEV"). In some embodiments, if usage requires AIs 606*a-n* (belonging to the same VDEV 604*a-n*) to communicate directly to emulate a single VDEV 604*a-n*, S-IOV devices 630 may implement the communication and provide required interfaces for associated software. For example, guest driver 610*a-n* may configure an AI 606*a-n* on one device to do DMA to another AI 606*a-n* of another S-IOV device 630 as part of VDEV I/O commands. For example, such a configuration may be used by VMM 620 to compose a VDEV 604*a-n* in which a total required number of AIS 606*a-n* may not be available on any single S-IOV device 630.

The ability to create heterogeneous virtual devices may provide IHVs with, among other things, the flexibility to reuse separate I/O devices and/or to provide a single driver to a VM as if it were a heterogeneous physical device. Component I/O devices may be designed to perform joint functionality on a heterogeneous device configured according to some embodiments. For instance, a virtual "NIC with on-board FPGA" may include guest programs on the NIC AI to receive a network packet and FPGA AI may perform various operations on the packet. A guest driver may configure or program the NIC AI to send the received packet to the FPGA AI according to some embodiments.

Included herein is a flow chart representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 7 depicts an illustrative logic flow according to a first embodiment. More specifically, FIG. 7 illustrates one embodiment of a logic flow 700. Logic flow 700 may be representative of some or all of the operations executed by one or more embodiments described herein for live VM migration. For example, logic flow 700 may illustrate operations performed by operating environments 100, 200, 300, 400, and/or 500.

In the illustrated embodiment shown in FIG. 7, logic flow 700 may initiate VM migration at block 710. For example, live migration of VM 515 from a source physical machine to a target physical machine (destination device) may be initiated within operating environment 500. At block 712, logic flow 700 may enable EPT A/D bits. For instance, EPT A/D bits may be enabled for all VCPUs of VM 515 that is being migrated. In some embodiments, if the EPT A/D bits are already enabled, the D-bits may be reset. At block 714, logic flow 700 may enable IOMMU A/D bits. For instance, IOMMU A/D bits may be enabled for all VCPUs of VM 515 that is being migrated. In some embodiments, if the IOMMU A/D bits are already enabled, the D-bits may be reset. Logic flow 700 may copy VM memory pages at block 716. For instance, while VCPUs and/or VDEVs of VM 515 are active, a copy (for instance, a "snapshot" copy) of all VM memory pages may be generated and copied to the migration destination, such as a target physical machine.

At block 720, logic flow 700 may copy modified memory pages. For instance, logic flow may find EPT modified memory pages at block 722 and find IOMMU modified memory pages at block 724. In some embodiments, EPT modified memory pages may include EPTs that have been modified. In various embodiments, IOMMU modified memory pages may include IOMMU mapped pages that have been modified. The modified memory pages may be copied and provided to the migration destination at block 726. The memory pages may be converged at block 728. For example, convergence may be determined based on one or more of an incremental size going below a size threshold, an amount of time a loop has been running going over a time threshold, a combination thereof, and/or the like. In some embodiments, logic flow may perform blocks 720, 722, and/or 724 in a loop, for instance, making incremental copies while VCPUs and/or VDEVs are active and until convergence at block 726 is complete.

Logic flow 700 may suspend the VM at block 730. For instance, logic flow 700 may suspend VCPUs at block 732 and/or inform the VDCM to suspend VDEV instances at block 734. In some embodiments, suspending VDEVs at block 734 may include the VDCM issuing an AI suspend command and waiting for the AI suspend complete command for all AIs assigned to the VDEV. In addition, outstanding I/O commands may be handled using one or more processes according to some embodiments. For example, handling of such outstanding I/O commands may be device specific and may be abstracted from VMM 530 using various interfaces, such as an AI suspend interface, an AI migration state interface, and/or an AI restore interface. For example, in some embodiments, physical device 550 may wait for all outstanding I/O commands from VM 515 to complete during an AI suspend process. Accordingly, an AI migration state process may not contain outstanding I/O commands. In this manner, an AI restore process associated with VM 515 may be simpler and more efficient. In another example, physical device 550 may wait to complete only outstanding I/O commands that are already in a processing pipeline of physical device 550 during an AI suspend process. For instance, physical device 550 may include the queued I/O commands (for example, that are still waiting to be processed) in an AI migration state process or element (for example, an information element). Accordingly, host driver 508 may save the outstanding I/O commands as part of an AI migration state process or element and migrate them to the target physical machine.

At optional block 736, logic flow may handle PRS requests according to some embodiments. For example, when physical device 550 encounters an I/O page fault and needs to perform PRS for an AI in an AI suspend process, physical device 550 may save the execution state of the corresponding I/O command as part of an AI migration state process or element. In this manner, the I/O command may be migrated to the target physical machine in the AI migration state process or element. On the target physical machine, host driver 508 may re-issue saved I/O commands to new AIs 564*a-c* as part of the AI restore process. Host driver 508 may resume AI operation while VMM 530 may resume VCPUs of VM 515, and physical device 550 may send PRS requests to VMM 530. In another example, physical device 550 may send PRS requests for an AI 564*a-n* to VMM 530 even when the AI suspend process has started. VMM 530 may determine if VMM 530 should handle the PRS request or forward the PRS request to VM 515. In various embodiments, VMM 530 may determine whether to handle the PRS request using the PASID and address in the PRS and walking the first-level page table. For example, if nested translation is not set up for this PASID, or if the fault is not in the first-level page table, VMM 530 may handle the PRS request and return a response. In another example, if nested translation is set for the PASID and the fault is in the first-level page table, the PRS request may be forwarded or otherwise provided to VM 515 for further handling. In a further example, if the PRS request is provided to VM 515 for further handling, VMM 530 may unmap fast path registers of assigned devices of VM 515 so that any fast path access (for instance, including work submissions) from VM 515 may cause a VM exit to VDCM instead of going directly to the physical device 550. The VCPU that the PRS interrupt is directed to may be resumed. In some embodiments, VMM 530 may also resume other VCPUS, either immediately and/or if/when the running VCPU sends and IPI to another VCPU. If VM 515 exits due to work submissions occurring before the AI suspend process completes, work commands within the VDCM may be queued. Once the AI suspend process completes, VCPUS may be suspended (or suspended again). The queued work commands may be included as part of the AI migration state element send to the target physical machine.

Logic flow 700 may scan and clear memory bits at block 740. For example, logic flow 700 may scan and clear EPT bits at block 742. In some embodiments, scanning and clearing EPT bits at block 742 may include scanning and clearing D-bits in the EPT to find dirtied pages, for instance, dirtied by CPUs since copying modified memory pages at block 720. In another example, logic flow 700 may scan and clear IOMMU bits at block 744. In some embodiments, scanning and clearing IOMMU bits at block 744 may include scanning and clearing D-bits in the IOMMU to find dirtied memory pages, for instance, dirtied by I/O devices (for example, physical device 550) since copying modified memory pages at block 720. Logic flow may copy the dirty pages and provide them to the migration destination at block 746.

At block 750, logic flow 700 may migrate virtual states of the VM. For example, logic flow may save VCPU state at block 752. In some embodiments, saving VCPU state at block 752 may include saving VCPU state information including any posted interrupts and/or VAPIC state information. At block 754, logic flow 700 may save migration states. For instance, VDCM 502 may save migration state information as one or more AI migration state elements that may include, for instance, all the AIs assigned to VM 515 using host driver 508. At block 756, logic flow 700 may provide virtual states to migration destination. For example, all VCPU and VDEV state information, including AI migration state elements, may be provided to the migration destination along with, for instance, other non-performance critical VDEV state information.

Logic flow 700 may generate VM on migration destination at block 760. For instance, on the migration destination, a VMM may create a new VM and restore all memory states received from the migration source (source physical machine). The VDCM on the migration destination may create a VDEV using the VDEV's virtual device state. The virtual registers may be initialized with values of source VDEV's corresponding virtual registers. In some embodiments, the VDCM may request that the host driver allocate the required AIs. The AI migration state information from the source AIs may be restored to the allocated AIs by the host driver, for instance, using an AI restore interface, and mapped to the migrated VMs VDEV. In various embodiments, the AIs may then be enabled and the VM resumed to normal operation.

Figure 8:
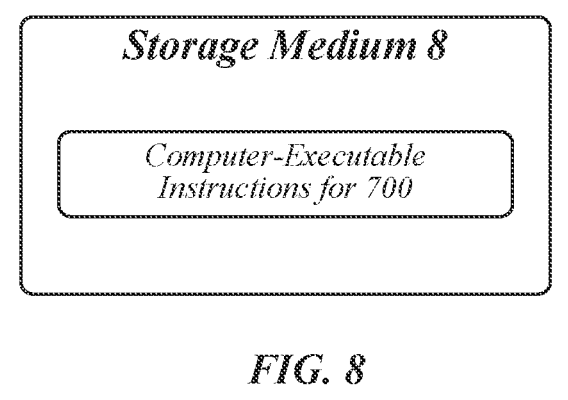

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
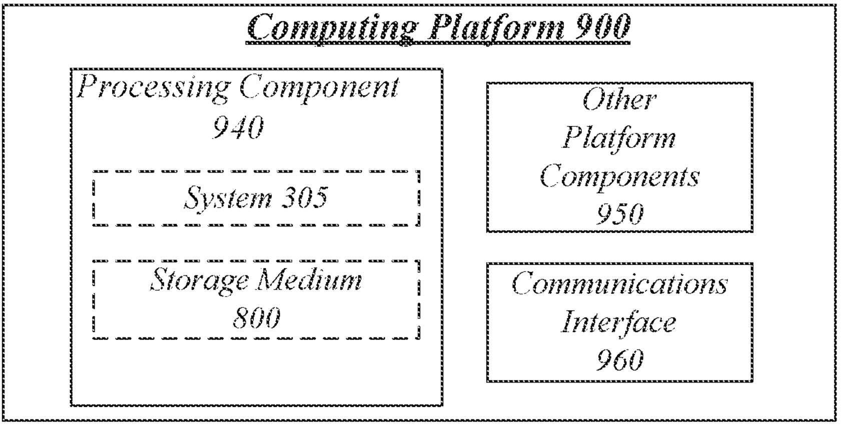
FIG. 9 illustrates an example computing platform.

FIG. 9 illustrates an example computing platform 900. In some examples, as shown in FIG. 9, computing platform 900 may include a processing component 940, other platform components or a communications interface 960. According to some examples, computing platform 900 may be implemented in a computing device such as a server in a system such as a data center. Embodiments are not limited in this context.

According to some examples, processing component 940 may execute processing operations or logic for system 305 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), memory units, logic gates, registers, semiconductor devices, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), doubledata rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as redundant array of independent disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, carrier sense multiple access with collision detection (CSMA/CD) access method and physical layer specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture Specification").

Computing platform 900 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, compact disk read only memory (CD-ROM), compact disk recordable (CD-R), compact disk rewriteable (CD-RW), optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting examples according to some embodiments:

Example 1 is an apparatus, comprising at least one memory, at least one processor, and logic to transfer a virtual machine (VM), at least a portion of the logic comprised in hardware coupled to the at least one memory and the at least one processor, the logic to generate a plurality of virtualized capability registers for a virtual device (VDEV) by virtualizing a plurality of device-specific capability registers of a physical device to be virtualized by a virtual machine monitor (VMM), the plurality of virtualized capability registers comprising a plurality of device-specific capabilities of the physical device, determine at least one version of the physical device to support via the VMM, and expose at least a subset of the virtualized capability registers associated with the at least one version to the VM.

Example 2 is the apparatus of Example 1, the logic to access the device-specific capability registers via a physical function (PF) driver of the physical device.

Example 3 is the apparatus of Example 1, the logic to operate a host driver, the host driver operative to access the device-specific capability registers via a physical function (PF) driver of the physical device.

Example 4 is the apparatus of Example 1, the logic to assign at least one command interface to the VM by mapping the at least one command interface into a memory-mapped I/O (MMIO) space of the VDEV.

Example 5 is the apparatus of Example 1, the logic to assign at least one command interface to the VM by mapping the at least one command interface into a memory-mapped I/O (MMIO) space of the VDEV, the at least one command interface comprising at least one assignable interface (AI) of a scalable input/output virtualization (S-IOV) architecture.

Example 6 is the apparatus of Example 1, the logic to migrate the VM to a computing device having the physical device compatible with the at least one version.

Example 7 is the apparatus of Example 1, the logic to expose at least a subset of the virtualized capability registers associated with the version to a guest driver of the VM.

Example 8 is the apparatus of Example 1, the logic to, via the VMM, determine a compatibility between a guest driver associated with the VM and a target physical device.

Example 9 is the apparatus of Example 1, the device-specific capability registers comprising memory-mapped I/O (MMIO) registers.

Example 10 is the apparatus of Example 1, the physical device comprising at least one input/output (I/O) device.

Example 11 is the apparatus of Example 1, comprising an input/output (I/O) memory management unit (IOMMU) to provide accessed and dirty (A/D) bit support for the IOMMU.

Example 12 is the apparatus of Example 1, the logic to detect dirty memory pages associated with the VM during VM migration using accessed and dirty (A/D) bit support of virtualization page-tables.

Example 13 is the apparatus of Example 1, the VDEV operative within a virtual device composition module (VDCM) of a host operating system (OS).

Example 14 is the apparatus of Example 1, the logic to copy modified memory pages of VM modified during migration of VM, and provide the modified memory pages to a migration destination for the VM.

Example 15 is the apparatus of Example 1, the logic to suspend the VM during migration of the VM to a migration destination, and clear modified bits in modified memory pages associated with VM responsive to suspension of the VM.

Example 16 is the apparatus of Example 1, the logic to suspend the VM during migration of the VM to a migration destination, and clear modified bits in modified memory pages associated with the VM responsive to suspension of the VM, the modified memory pages comprising at least one of second-level translation tables or input/output (I/O) memory management unit (IOMMU) mapped pages.

Example 17 is the apparatus of Example 1, the logic to save migration state information in a migration state element.

Example 18 is the apparatus of Example 1, the logic to save migration state information in a migration state element, the migration state element comprising a command interface element comprising a migration state for at least one command interface assigned to the VM.

Example 19 is the apparatus of Example 1, the logic to provide the device-specific capabilities of the physical device to a guest driver associated with the physical device via providing access to the at least a subset of the virtualized capability registers to the guest driver.

Example 20 is the apparatus of Example 1, the logic to communicate with the physical device via at least one command interface, the at least one command interface comprising at least one assignable interface.

Example 21 is the apparatus of Example 1, the logic to provide a command interface suspend request message to request the physical device to suspend a command interface prior to a migration of the VM.

Example 22 is the apparatus of Example 1, the logic to provide a command interface restore request message to request the physical device to restore a command interface after a migration of the VM.

Example 23 is the apparatus of Example 1, the logic to receive a command interface migration state element from the physical device, the command interface migration state comprising command interface state information to resume a command interface after migration of the VM.

Example 24 is the apparatus of Example 1, the logic to receive a command interface migration state element from the physical device, the command interface migration state comprising command interface state information to resume a command interface after migration of the VM, the command interface state information comprising queued input/output (I/O) commands.

Example 25 is the apparatus of Example 1, the logic to determine that the physical device handles page request service (PRS) requests, receive an execution state of an input/output (I/O) command from the physical device, the I/O command associated with a PRS I/O page fault, and provide the I/O command to a target physical machine during migration of the VM.

Example 26 is the apparatus of Example 1, the logic to receive, at the VMM, a page service request service (PRS) request from the physical device during migration of the VM.

Example 27 is the apparatus of Example 1, the logic to receive, at the VMM, a page request service (PRS) request from the physical device during migration of the VM, and determine whether to handle the PRS request via the VMM or the VM.

Example 28 is the apparatus of Example 1, the logic to receive, at the VMM, a page request service (PRS) request from the physical device during migration of the VM, and perform the PRS request, via the VMM, based on one of an address space associated with the VMM in the PRS or a location of a fault of the PRS.

Example 29 is the apparatus of Example 1, the VM operative in a single root input/output virtualization (SR-IOV) architecture.

Example 30 is the apparatus of Example 1, the VM operative in a scalable input/output virtualization (S-IOV) architecture.

Example 31 is a system to provide parallel decompression, comprising an apparatus according to any of Examples 1 to 33, and at least one radio frequency (RF) transceiver.

Example 32 is a method to transfer a virtual machine (VM), the method comprising generating a plurality of virtualized capability registers for a virtual device (VDEV) by virtualizing a plurality of device-specific capability registers of a physical device to be virtualized by the VMM, the plurality of virtualized capability registers comprising a plurality of device-specific capabilities of the physical device, determining at least one version of the physical device to support via a virtual machine monitor (VMM), and exposing a subset of the virtualized capability registers associated with the at least one version to the VM.

Example 33 is the method of Example 32, comprising accessing the device-specific capability registers via a physical function (PF) driver of the physical device.

Example 34 is the method of Example 32, comprising operating a host driver, the host driver operative to access the device-specific capability registers via a physical function (PF) driver of the physical device.

Example 35 is the method of Example 32, comprising assigning at least one command interface to the VM by mapping the at least one command interface into a memory-mapped I/O (MMIO) space of the VDEV.

Example 36 is the method of Example 32, comprising assigning at least one command interface to the VM by mapping the at least one command interface into a memory-mapped I/O (MMIO) space of the VDEV, the at least one command interface comprising at least one assignable interface (AI) of a scalable input/output virtualization (S-IOV) architecture.

Example 37 is the method of Example 32, comprising migrating the VM to a computing device having the physical device compatible with the at least one version.

Example 38 is the method of Example 32, comprising exposing at least a subset of the virtualized capability registers associated with the version to a guest driver of the VM.

Example 39 is the method of Example 32, comprising determining, via the VMM, a compatibility between a guest driver associated with the VM and a target physical device.

Example 40 is the method of Example 32, the device-specific capability registers comprising memory-mapped I/O (MMIO) registers.

Example 41 is the method of Example 32, the physical device comprising at least one input/output (I/O) device.

Example 42 is the method of Example 32, comprising providing accessed and dirty (A/D) bit support for an input/output (I/O) memory management unit (IOMMU).

Example 43 is the method of Example 32, comprising detecting dirty memory pages associated with the VM during VM migration using accessed and dirty (A/D) bit support of virtualization page-tables.

Example 44 is the method of Example 32, the VDEV operative within a virtual device composition module (VDCM) of a host operating system (OS).

Example 45 is the method of Example 32, comprising copying modified memory pages of VM modified during migration of VM, and providing the modified memory pages to a migration destination for the VM.

Example 46 is the method of Example 32, comprising suspending the VM during migration of the VM to a migration destination, and clearing modified bits in modified memory pages associated with the VM responsive to suspension of the VM.

Example 47 is the method of Example 32, comprising suspending the VM during migration of the VM to a migration destination, and clearing modified bits in modified memory pages associated with the VM responsive to suspension of the VM, the modified memory pages comprising at least one of second-level translation tables or input/output (I/O) memory management unit (IOMMU) mapped pages.

Example 48 is the method of Example 32, comprising saving migration state information in a migration state element.

Example 49 is the method of Example 32, comprising saving migration state information in a migration state element, the migration state element comprising a command interface element comprising a migration state for at least one command interface assigned to the VM.

Example 50 is the method of Example 32, comprising providing the device-specific capabilities of the physical device to a guest driver associated with the physical device via providing access to the at least a subset of the virtualized capability registers to the guest driver.

Example 51 is the method of Example 32, comprising communicating with the physical device via at least one command interface, the at least one command interface comprising at least one assignable interface.

Example 52 is the method of Example 32, comprising providing a command interface suspend request message to request the physical device to suspend a command interface prior to a migration of the VM.

Example 53 is the method of Example 32, comprising providing a command interface restore request message to request the physical device to restore a command interface after a migration of the VM.

Example 54 is the method of Example 32, comprising receiving a command interface migration state element from the physical device, the command interface migration state comprising command interface state information to resume a command interface after migration of the VM.

Example 55 is the method of Example 32, comprising receiving a command interface migration state element from the physical device, the command interface migration state comprising command interface state information to resume a command interface after migration of the VM, the command interface state information comprising queued input/output (I/O) commands.

Example 56 is the method of Example 32, comprising determining that the physical device handles page request service (PRS) requests, receiving an execution state of an input/output (I/O) command from the physical device, the I/O command associated with a PRS I/O page fault, and providing the I/O command to a target physical machine during migration of the VM.

Example 57 is the method of Example 32, comprising receiving, at the VMM, page request service (PRS) requests from the physical device during migration of the VM.

Example 58 is the method of Example 32, comprising receiving, at the VMM, page request service (PRS) requests from the physical device during migration of the VM, and determining whether to handle the PRS requests via the VMM or the VM.

Example 59 is the method of Example 32, comprising receiving, at the VMM, a page request service (PRS) request from the physical device during migration of the VM, and performing the PRS request at the VMM based on one of an address space associated with the VMM in the PRS or a location of a fault of the PRS.

Example 60 is a computer-readable storage medium that stores instructions for execution by processing circuitry of a computing device to transfer a virtual machine (VM), the instructions to cause the computing device to generate a plurality of virtualized capability registers for a virtual device (VDEV) by virtualizing a plurality of device-specific capability registers of a physical device to be virtualized by the VMM, the plurality of virtualized capability registers comprising a plurality of device-specific capabilities of the physical device, determine at least one version of the physical device to support via a virtual machine monitor (VMM), and expose a subset of the virtualized capability registers associated with the at least one version to the VM.

Example 61 is the computer-readable storage medium of Example 60, comprising instructions to cause the computing device to access the device-specific capability registers via a physical function (PF) driver of the physical device.

Example 62 is the computer-readable storage medium of Example 60, comprising instructions to cause the computing device to operate a host driver, the host driver operative to access the device-specific capability registers via a physical function (PF) driver of the physical device.

Example 63 is the computer-readable storage medium of Example 60, comprising instructions to cause the computing device to assign at least one command interface to the VM by mapping the at least one command interface into a memory-mapped I/O (MMIO) space of the VDEV.

Example 64 is the computer-readable storage medium of Example 60, comprising instructions to cause the computing device to assign at least one command interface to the VM by mapping the at least one command interface into a memory-mapped I/O (MMIO) space of the VDEV, the at least one command interface comprising at least one assignable interface (AI) of a scalable input/output virtualization (S-IOV) architecture.

Example 65 is the computer-readable storage medium of Example 60, comprising instructions to cause the computing device to migrate the VM to a computing device having the physical device compatible with the at least one version.

Example 66 is the computer-readable storage medium of Example 60, comprising instructions to cause the computing device to expose at least a subset of the virtualized capability registers associated with the version to a guest driver of the VM.

Example 67 is the computer-readable storage medium of Example 60, comprising instructions to cause the computing device to determine, via the VMM, a compatibility between a guest driver associated with the VM and a target physical device.

Example 68 is the computer-readable storage medium of Example 60, the device-specific capability registers comprising memory-mapped I/O (MMIO) registers.

Example 69 is the computer-readable storage medium of Example 60, the physical device comprising at least one input/output (I/O) device.

Example 70 is the computer-readable storage medium of Example 60, comprising instructions to cause the computing device to provide accessed and dirty (A/D) bit support for an input/output (I/O) memory management unit (IOMMU).

Example 71 is the computer-readable storage medium of Example 60, comprising instructions to cause the computing device to detect dirty memory pages associated with the VM during VM migration using accessed and dirty (A/D) bit support of virtualization page-tables.

Example 72 is the computer-readable storage medium of Example 60, the VDEV operative within a virtual device composition module (VDCM) of a host operating system (OS).

Example 73 is the computer-readable storage medium of Example 60, comprising instructions to cause the computing device to copy modified memory pages of the VM modified during migration of the VM, and provide the modified memory pages to a migration destination for the VM.

Example 74 is the computer-readable storage medium of Example 60, comprising instructions to cause the computing device to suspend the VM during migration of the VM to a migration destination, and clear modified bits in modified memory pages associated with the VM responsive to suspension of the VM.

Example 75 is the computer-readable storage medium of Example 60, comprising instructions to cause the computing device to suspend the VM during migration of the VM to a migration destination, and clear modified bits in modified memory pages associated with the VM responsive to suspension of the VM, the modified memory pages comprising at least one of second-level translation tables or input/output (I/O) memory management unit (IOMMU) mapped pages.

Example 76 is the computer-readable storage medium of Example 60, comprising instructions to cause the computing device to save migration state information in a migration state element.

Example 77 is the computer-readable storage medium of Example 60, comprising instructions to cause the computing device to save migration state information in a migration state element, the migration state element comprising a command interface element comprising a migration state for at least one command interface assigned to the VM.

Example 78 is the computer-readable storage medium of Example 60, comprising instructions to cause the computing device to provide the device-specific capabilities of the physical device to a guest driver associated with the physical device via providing access to the at least a subset of the virtualized capability registers to the guest driver.

Example 79 is the computer-readable storage medium of Example 60, comprising instructions to cause the computing device to communicate with the physical device via at least one command interface, the at least one command interface comprising at least one assignable interface.

Example 80 is the computer-readable storage medium of Example 60, comprising instructions to cause the computing device to provide a command interface suspend request message to request the physical device to suspend a command interface prior to a migration of the VM.

Example 81 is the computer-readable storage medium of Example 60, comprising instructions to cause the computing device to provide a command interface restore request message to request the physical device to restore a command interface after a migration of the VM.

Example 82 is the computer-readable storage medium of Example 60, comprising instructions to cause the computing device to receive a command interface migration state element from the physical device, the command interface migration state comprising command interface state information to resume a command interface after migration of the VM.

Example 83 is the computer-readable storage medium of Example 60, comprising instructions to cause the computing device to receive a command interface migration state element from the physical device, the command interface migration state comprising command interface state information to resume a command interface after migration of the VM, the command interface state information comprising queued input/output (I/O) commands.

Example 84 is the computer-readable storage medium of Example 60, comprising instructions to cause the computing device to determine that the physical device handles page request service (PRS) requests, receive an execution state of an input/output (I/O) command from the physical device, the I/O command associated with a PRS I/O page fault, and provide the I/O command to a target physical machine during migration of the VM.

Example 85 is the computer-readable storage medium of Example 60, comprising instructions to cause the computing device to receive, at the VMM, page request service (PRS) requests from the physical device during migration of the VM.

Example 86 is the computer-readable storage medium of Example 60, comprising instructions to cause the computing device to receive, at the VMM, page request service (PRS) requests from the physical device during migration of the VM, and determine whether to handle the PRS requests via the VMM or the VM.

Example 87 is the computer-readable storage medium of Example 60, comprising instructions to cause the computing device to receive, at the VMM, a page request service (PRS) request from the physical device during migration of the VM, and perform the PRS request at the VMM based on one of an address space associated with the VMM in the PRS or a location of a fault of the PRS.

Example 88 is an apparatus, comprising a device version means to determine at least one version of a physical device to support via a virtual machine manager VMM means, and a virtual capability register means to generate a plurality of virtualized capability registers for a virtual device (VDEV) by virtualizing a plurality of device-specific capability registers of the physical device to be virtualized by the VMM means, the plurality of virtualized capability registers comprising a plurality of device-specific capabilities of the physical device, and expose at least a subset of the virtualized capability registers associated with the at least one version to the VM.

Example 89 is the apparatus of Example 88, the virtual capability register means to access the device-specific capability registers via a physical function (PF) driver of the physical device.

Example 90 is the apparatus of Example 88, a host means to operate a host driver, the host driver operative to access the device-specific capability registers via a physical function (PF) driver of the physical device.

Example 91 is the apparatus of Example 88, a command interface means to assign at least command interface to the VM by mapping the at least one command interface into a memory-mapped I/O (MMIO) space of the VDEV.

Example 92 is the apparatus of Example 88, a VM migration means to migrate the VM to a computing device having the physical device compatible with the at least one version.

Example 93 is the apparatus of Example 88, the virtual capability register means to expose at least a subset of the virtualized capability registers associated with the version to a guest driver of the VM.

Example 94 is the apparatus of Example 88, the VMM means to determine a compatibility between a guest driver associated with the VM and a target physical device.

Example 95 is the apparatus of Example 88, the device-specific capability registers comprising memory-mapped I/O (MMIO) registers.

Example 96 is the apparatus of Example 88, the physical device comprising at least one input/output (I/O) device.

Example 97 is the apparatus of Example 88, comprising an input/output (I/O) memory management unit (IOMMU) to provide accessed and dirty (A/D) bit support for the IOMMU.

Example 98 is the apparatus of Example 88, a memory monitoring means to detect dirty memory pages associated with the VM during VM migration using accessed and dirty (A/D) bit support of virtualization page-tables.

Example 99 is the apparatus of Example 88, the VDEV operative within a virtual device composition module (VDCM) of a host operating system (OS).

Example 100 is the apparatus of Example 88, a memory monitoring means to copy modified memory pages of the VM modified during migration of the VM, and provide the modified memory pages to a migration destination for the VM.

Example 101 is the apparatus of Example 88, a VM migration means to suspend the VM during migration of the VM to a migration destination, and clear modified bits in modified memory pages associated with the VM responsive to suspension of the VM.

Example 102 is the apparatus of Example 88, a VM migration means to suspend the VM during migration of the VM to a migration destination, and clear modified bits in modified memory pages associated with the VM responsive to suspension of the VM, the modified memory pages comprising at least one of second-level translation tables or input/output (I/O) memory management unit (IOMMU) mapped pages.

Example 103 is the apparatus of Example 88, a VM migration means to save migration state information in a migration state element.

Example 104 is the apparatus of Example 88, a VM migration means to save migration state information in a migration state element, the migration state element comprising a command interface element comprising a migration state for at least one command interface. assigned to the VM.

Example 105 is the apparatus of Example 88, a VM migration means to provide the device-specific capabilities of the physical device to a guest driver associated with the physical device via providing access to the at least a subset of the virtualized capability registers to the guest driver.

Example 106 is the apparatus of Example 88, the VMM means to communicate with the physical device via at least one command interface, the at least one command interface comprising at least one assignable interface.

Example 107 is the apparatus of Example 88, the VMM means to provide a command interface suspend request message to request the physical device to suspend a command interface prior to a migration of the VM.

Example 108 is the apparatus of Example 88, the VMM means to provide a command interface restore request message to request the physical device to restore a command interface after a migration of the VM.

Example 109 is the apparatus of Example 88, the VMM means to receive a command interface migration state element from the physical device, the command interface migration state comprising command interface state information to resume a command interface after migration of the VM.

Example 110 is the apparatus of Example 88, the VMM means to receive a command interface migration state element from the physical device, the command interface migration state comprising command interface state information to resume a command interface after migration of the VM, the command interface state information comprising queued input/output (I/O) commands.

Example 111 is the apparatus of Example 88, the VMM means to determine that the physical device handles page request service (PRS) requests, receive an execution state of an input/output (I/O) command from the physical device, the I/O command associated with a PRS I/O page fault, and provide the I/O command to a target physical machine during migration of the VM.

Example 112 is the apparatus of Example 88, the VMM means to receive a page request service (PRS) request from the physical device during migration of the VM.

Example 113 is the apparatus of Example 88, the VMM means to receive a page request service (PRS) request from the physical device during migration of the VM, and determine whether to handle the PRS request via the VMM means or the VM.

Example 114 is the apparatus of Example 88, the VMM means to receive a page request service (PRS) request from the physical device during migration of the VM, and perform the PRS request, via the VMM means, based on one of an address space associated with the VMM means in the PRS or a location of a fault of the PRS.

Example 115 is an apparatus, comprising at least one memory, at least one processor, and logic to manage resources of at least one virtual machine (VM) in a virtualized computing environment, at least a portion of the logic comprised in hardware coupled to the at least one memory and the at least one processor, the logic to emulate at least one virtual device (VDEV) via a virtual device composition module (VDCM), the VDEV comprising at least one command interface, map the at least one command interface to at least one command interface memory-mapped I/O (MMIO) register of at least one physical device, the at least one command interface MMIO register associated with at least one backend resource, and map the at least one command interface to the at least one VM to provide the at least one VM access to the at least one backend resource.

Example 116 is the apparatus of Example 115, the at least one command interface comprising at least one assignable interface (AI) of a scalable input/output virtualization (S-IOV) architecture.

Example 117 is the apparatus of Example 115, the logic to map the at least one command interface to the VM using a second-level translation table of the at least one processor.

Example 118 is the apparatus of Example 115, the logic to provide a virtual machine manager (VMM), the VMM to generate the at least one VDEV.

Example 119 is the apparatus of Example 115, the logic to indicate a page-fault status of the at least one command interface.

Example 120 is the apparatus of Example 115, the logic to indicate a page-fault status of the at least one command interface, the page-fault status to indicate whether the at least one command interface is one of fully page-fault capable, partially page-fault capable, or not page-fault capable.

Example 121 is the apparatus of Example 115, the logic to support memory over-commit for the at least one VM responsive to determining that the at least one command interface is fully page-fault capable.

Example 122 is the apparatus of Example 115, the logic to support memory over-commit for the at least one VM for at least one command interface that is fully page-fault capable via page-fault handling using at least one MMIO capability register of a host driver.

Example 123 is the apparatus of Example 115, the logic to support memory over-commit for the at least one VM for at least one command interface that is fully page-fault capable via page-fault handling using a host driver.

Example 124 is the apparatus of Example 115, the logic to receive an indication that the at least one command interface is partially page-fault capable, and determine pinned memory pages of a guest driver associated with the at least one VM.

Example 125 is the apparatus of Example 115, the logic to receive an indication that the at least one command interface is partially page-fault capable, determine pinned memory pages of a guest driver associated with the at least one VM, and pin the pinned memory pages in a second-level translation table used by a virtual memory manager (VMM) associated with the at least one VM.

Example 126 is the apparatus of Example 115, the logic to determine at least one VM resource requirement for the at least one VM.

Example 127 is the apparatus of Example 115, the logic to re-map the at least one command interface based on a VM resource requirement of the at least one VM.

Example 128 is the apparatus of Example 115, the at least one VM comprising a first VM and a second VM, and the at least one command interface comprising a first command interface mapped to the first VM and a second command interface mapped to the second VM, the logic to unmap the first command interface from the first VM, and map the first command interface to the second VM.

Example 129 is the apparatus of Example 115, the at least one VM comprising a first VM and a second VM, and the at least one command interface comprising a first command interface mapped to the first VM and a second command interface mapped to the second VM, the logic to determine a VM resource requirement for the first VM and the second VM, re-map the first command interface to the second VM responsive to the VM resource requirement for the second VM being greater than for the first VM.

Example 130 is the apparatus of Example 115, the at least one command interface comprising a plurality of at least one command interfaces, at least a portion of the at least one command interfaces associated with at least one different physical device.

Example 131 is the apparatus of Example 115, the at least one command interface comprising a plurality of at least one command interfaces, at least a portion of the at least one command interfaces associated with a plurality of different physical devices, each of the plurality of different physical devices comprising a same type of physical device.

Example 132 is the apparatus of Example 115, the at least one command interface comprising a plurality of at least one command interfaces, at least a portion of the at least one command interfaces associated with a plurality of different physical devices, at least a portion of the plurality of different physical devices comprising a different type of physical device.

Example 133 is a system to provide parallel decompression, comprising an apparatus according to any of examples 115 to 132, and at least one radio frequency (RF) transceiver.

Example 134 is a method to manage resources of at least one virtual machine (VM) in a virtualized computing environment, comprising emulating at least one virtual device (VDEV) via a virtual device composition module (VDCM), the VDEV comprising at least one command interface, mapping the at least one command interface to at least one command interface memory-mapped I/O (MMIO) register of at least one physical device, the at least one command interface MMIO register associated with at least one backend resource, and mapping the at least one command interface to the VM to provide the VM access to the at least one backend resource.

Example 135 is the method of Example 134, the at least one command interface comprising at least one assignable interface (AI) of a scalable input/output virtualization (S-IOV) architecture.

Example 136 is the method of Example 134, comprising mapping the at least one command interface to the VM using a second-level translation table of the at least one processor.

Example 137 is the method of Example 134, comprising providing a virtual machine manager (VMM), the VMM to generate the at least one VDEV.

Example 138 is the method of Example 134, comprising indicating a page-fault status of the at least one command interface.

Example 139 is the method of Example 134, comprising indicating a page-fault status of the at least one command interface, the page-fault status to indicate whether the at least one command interface is one of fully page-fault capable, partially page-fault capable, or not page-fault capable.

Example 140 is the method of Example 134, comprising supporting memory over-commit for the at least one VM responsive to determining that the at least one command interface is fully page-fault capable.

Example 141 is the method of Example 134, comprising supporting memory over-commit for the at least one VM for at least one command interface that is fully page-fault capable via page-fault handling using at least one MMIO capability register of a host driver.

Example 142 is the method of Example 134, comprising supporting memory over-commit for the at least one VM for at least one command interface that is fully page-fault capable via page-fault handling using a host driver.

Example 143 is the method of Example 134, comprising receiving an indication that the at least one command interface is partially page-fault capable, and determining pinned memory pages of a guest driver associated with the at least one VM.

Example 144 is the method of Example 134, comprising receiving an indication that the at least one command interface is partially page-fault capable, determining pinned memory pages of a guest driver associated with the at least one VM, and pinning the pinned memory pages in a second-level translation table used by a virtual memory manager (VMM) associated with the at least one VM.

Example 145 is the method of Example 134, comprising determining at least one VM resource requirement for the at least one VM.

Example 146 is the method of Example 134, comprising re-mapping the at least one command interface based on a VM resource requirement of the at least one VM.

Example 147 is the method of Example 134, the at least one VM comprising a first VM and a second VM, and the at least one command interface comprising a first command interface mapped to the first VM and a second command interface mapped to the second VM, comprising unmapping the first command interface from the first VM, and mapping the first command interface to the second VM.

Example 148 is the method of Example 134, the at least one VM comprising a first VM and a second VM, and the at least one command interface comprising a first command interface mapped to the first VM and a second command interface mapped to the second VM, comprising determining a VM resource requirement for the first VM and the second VM, re-mapping the first command interface to the second VM responsive to the VM resource requirement for the second VM being greater than for the first VM.

Example 149 is the method of Example 134, the at least one command interface comprising a plurality of at least one command interfaces, at least a portion of the at least one command interfaces associated with at least one different physical device.

Example 150 is the method of Example 134, the at least one command interface comprising a plurality of at least one command interfaces, at least a portion of the at least one command interfaces associated with a plurality of different physical devices, each of the plurality of different physical devices comprising a same type of physical device.

Example 151 is the method of Example 134, the at least one command interface comprising a plurality of at least one command interfaces, at least a portion of the at least one command interfaces associated with a plurality of different physical devices, at least a portion of the plurality of different physical devices comprising a different type of physical device.

Example 152 is a computer-readable storage medium that stores instructions for execution by processing circuitry of a computing device to manage resources of at least one virtual machine (VM) in a virtualized computing environment, the instructions to cause the computing device to emulate at least one virtual device (VDEV) via a virtual device composition module (VDCM), the VDEV comprising at least one command interface, mapping the at least one command interface to at least one command interface memory-mapped I/O (MMIO) register of at least one physical device, the at least one command interface MMIO register associated with at least one backend resource, and mapping the at least one command interface to the VM to provide the VM access to the at least one backend resource.

Example 153 is the computer-readable storage medium of Example 152, the at least one command interface comprising at least one assignable interface (AI) of a scalable input/output virtualization (S-IOV) architecture.

Example 154 is the computer-readable storage medium of Example 152, the instructions to cause the computing device to map the at least one command interface to the VM using a second-level translation table of the at least one processor.

Example 155 is the computer-readable storage medium of Example 152, the instructions to cause the computing device to provide a virtual machine manager (VMM), the VMM to generate the at least one VDEV.

Example 156 is the computer-readable storage medium of Example 152, the instructions to cause the computing device to indicate a page-fault status of the at least one command interface.

Example 157 is the computer-readable storage medium of Example 152, the instructions to cause the computing device to indicate a page-fault status of the at least one command interface, the page-fault status to indicate whether the at least one command interface is one of fully page-fault capable, partially page-fault capable, or not page-fault capable.

Example 158 is the computer-readable storage medium of Example 152, the instructions to cause the computing device to support memory over-commit for the at least one VM responsive to determining that the at least one command interface is fully page-fault capable.

Example 159 is the computer-readable storage medium of Example 152, the instructions to cause the computing device to support memory over-commit for the at least one VM for at least one command interface that is fully page-fault capable via page-fault handling using at least one MMIO capability register of a host driver.

Example 160 is the computer-readable storage medium of Example 152, the instructions to cause the computing device to support memory over-commit for the at least one VM for at least one command interface that is fully page-fault capable via page-fault handling using a host driver.

Example 161 is the computer-readable storage medium of Example 152, the instructions to cause the computing device to receive an indication that the at least one command interface is partially page-fault capable, and determine pinned memory pages of a guest driver associated with the at least one VM.

Example 162 is the computer-readable storage medium of Example 152, the instructions to cause the computing device to receive an indication that the at least one command interface is partially page-fault capable, determine pinned memory pages of a guest driver associated with the at least one VM, and pin the pinned memory pages in a second-level translation table used by a virtual memory manager (VMM) associated with the at least one VM.

Example 163 is the computer-readable storage medium of Example 152, the instructions to cause the computing device to determine at least one VM resource requirement for the at least one VM.

Example 164 is the computer-readable storage medium of Example 152, the instructions to cause the computing device to re-map the at least one command interface based on a VM resource requirement of the at least one VM.

Example 165 is the computer-readable storage medium of Example 152, the at least one VM comprising a first VM and a second VM, and the at least one command interface comprising a first command interface mapped to the first VM and a second command interface mapped to the second VM, the instructions to cause the computing device to unmap the first command interface from the first VM, and map the first command interface to the second VM.

Example 166 is the computer-readable storage medium of Example 152, the at least one VM comprising a first VM and a second VM, and the at least one command interface comprising a first command interface mapped to the first VM and a second command interface mapped to the second VM, the instructions to cause the computing device to determine a VM resource requirement for the first VM and the second VM, re-map the first command interface to the second VM responsive to the VM resource requirement for the second VM being greater than for the first VM.

Example 167 is the computer-readable storage medium of Example 152, the at least one command interface comprising a plurality of at least one command interfaces, at least a portion of the at least one command interfaces associated with at least one different physical device.

Example 168 is the computer-readable storage medium of Example 152, the at least one command interface comprising a plurality of at least one command interfaces, at least a portion of the at least one command interfaces associated with a plurality of different physical devices, each of the plurality of different physical devices comprising a same type of physical device.

Example 169 is the computer-readable storage medium of Example 152, the at least one command interface comprising a plurality of at least one command interfaces, at least a portion of the at least one command interfaces associated with a plurality of different physical devices, at least a portion of the plurality of different physical devices comprising a different type of physical device.

Example 170 is an apparatus to manage resources of at least one virtual machine (VM) in a virtualized computing environment, comprising a virtual device means to emulate at least one virtual device (VDEV) via a virtual device composition module (VDCM), the VDEV comprising at least one command interface, and a mapping means to map the at least one command interface to at least one command interface memory-mapped I/O (MMIO) register of at least one physical device, the at least one command interface MMIO register associated with at least one backend resource, and map the at least one command interface to the at least one VM to provide the at least one VM access to the at least one backend resource.

Example 171 is the apparatus of Example 170, the at least one command interface comprising at least one assignable interface (AI) of a scalable input/output virtualization (S-IOV) architecture.

Example 172 is the apparatus of Example 170, the mapping means to map the at least one command interface to the VM using a second-level translation table of the at least one processor.

Example 173 is the apparatus of Example 170, a virtual machine manager (VMM) means to generate the at least one VDEV.

Example 174 is the apparatus of Example 170, a memory overcommit means to indicate a page-fault status of the at least one command interface.

Example 175 is the apparatus of Example 170, a memory overcommit means to indicate a page-fault status of the at least one command interface, the page-fault status to indicate whether the at least one command interface is one of fully page-fault capable, partially page-fault capable, or not page-fault capable.

Example 176 is the apparatus of Example 170, the memory overcommit to support memory over-commit for the at least one VM responsive to determining that the at least one command interface is fully page-fault capable.

Example 177 is the apparatus of Example 170, the memory overcommit to support memory over-commit for the at least one VM for at least one command interface that is fully page-fault capable via page-fault handling using at least one MMIO capability register of a host driver.

Example 178 is the apparatus of Example 170, the memory overcommit to support memory over-commit for the at least one VM for at least one command interface that is fully page-fault capable via page-fault handling using a host driver.

Example 179 is the apparatus of Example 170, the memory overcommit to receive an indication that the at least one command interface is partially page-fault capable, and determine pinned memory pages of a guest driver associated with the at least one VM.

Example 180 is the apparatus of Example 170, the memory overcommit to receive an indication that the at least one command interface is partially page-fault capable, determine pinned memory pages of a guest driver associated with the at least one VM, and pin the pinned memory pages in a second-level translation table used by a virtual memory manager (VMM) associated with the at least one VM.

Example 181 is the apparatus of Example 170, a device overcommit means to determine at least one VM resource requirement for the at least one VM.

Example 182 is the apparatus of Example 170, a device overcommit means to re-map the at least one command interface based on a VM resource requirement of the at least one VM.

Example 183 is the apparatus of Example 170, the at least one VM comprising a first VM and a second VM, and the at least one command interface comprising a first command interface mapped to the first VM and a second command interface mapped to the second VM, comprising a device overcommit means to unmap the first command interface from the first VM, and map the first command interface to the second VM.

Example 184 is the apparatus of Example 170, the at least one VM comprising a first VM and a second VM, and the at least one command interface comprising a first command interface mapped to the first VM and a second command interface mapped to the second VM, comprising a device overcommit means to determine a VM resource requirement for the first VM and the second VM, re-map the first command interface to the second VM responsive to the VM resource requirement for the second VM being greater than for the first VM.

Example 185 is the apparatus of Example 170, the at least one command interface comprising a plurality of at least one command interfaces, at least a portion of the at least one command interfaces associated with at least one different physical device.

Example 186 is the apparatus of Example 170, the at least one command interface comprising a plurality of at least one command interfaces, at least a portion of the at least one command interfaces associated with a plurality of different physical devices, each of the plurality of different physical devices comprising a same type of physical device.

Example 187 is the apparatus of Example 170, the at least one command interface comprising a plurality of at least one command interfaces, at least a portion of the at least one command interfaces associated with a plurality of different physical devices, at least a portion of the plurality of different physical devices comprising a different type of physical device.

Example 188 is a system to provide parallel decompression, comprising an apparatus according to any of examples 170 to 187, and at least one radio frequency (RF) transceiver.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:

a memory controller to couple to a system memory; and one or more cores coupled to the memory controller, the one or more cores to execute instructions to implement a first virtualization environment comprising a hypervisor and a plurality of virtual machines (VMs);

an input/output virtualization (IOV) device to be selectively shared by the plurality of VMs, wherein the IOV device is to expose capabilities in a plurality of memory-mapped IO (MMIO) registers, the hypervisor to access the plurality of MMIO registers to determine a subset of the capabilities to be provided to a first VM of the plurality of VMs, the IOV device comprising:

a plurality of assignable device interfaces (ADIs), a first ADI of the plurality of ADIs to be assigned to the first VM to provide the subset of capabilities to the first VM, the first ADI and the first VM associated with a first address space;

circuitry to migrate an architectural state stored in the first address space and associated with the first VM to a second virtualization environment while the first VM is in a live or active state, the architectural state including a state of the first IOV device, wherein the second virtualization environment includes a second IOV device, wherein the circuitry is to:

transmit the architectural state to the second virtualization environment, wherein the first VM including the architectural state is to be restored in the second virtualization environment.

2. The apparatus of claim 1, wherein the second IOV device is to be initialized with the state of the first IOV device within the second virtualization environment.

3. The apparatus of claim 1, wherein the circuitry to migrate includes the one or more cores executing instructions to migrate the architectural state.

4. The apparatus of claim 1, further comprising:

an input-output memory management unit (IOMMU) to perform virtual to physical address translations using a set of page tables to provide access to the first memory address space.

5. The apparatus of claim 1, wherein after the first state is restored on the second virtualization environment, the first VM is stopped in the first virtualization environment and started in the second virtualization environment.

6. The apparatus of claim 4, wherein each entry in at least a subset of the set of page tables includes a mapping from a virtual address to a corresponding physical address of a page in the first memory address space.

7. The apparatus of claim 6, wherein each entry further includes a bit to indicate whether a corresponding page in the first memory address space has been modified.

8. The apparatus of claim 7, wherein the circuitry is to selectively migrate only those pages in the first memory space which were modified following transmitting of the architectural state.

9. A method, comprising:

executing instructions by one or more cores coupled to a memory controller to implement a first virtualization environment comprising a hypervisor and a plurality of virtual machines (VMs);

selectively sharing an input/output virtualization (IOV) device by the plurality of VMs, wherein the IOV device is to expose capabilities in a plurality of memory-mapped IO (MMIO) registers, the hypervisor to access the plurality of MMIO registers to determine a subset of the capabilities to be provided to a first VM of the plurality of VMs, the IOV device comprising:

a plurality of assignable device interfaces (ADIs), a first ADI of the plurality of ADIs to be assigned to the first VM to provide the subset of capabilities to the first VM, the first ADI and the first VM associated with a first address space;

migrating an architectural state stored in the first address space and associated with the first VM to a second virtualization environment while the first VM is in a live or active state, the architectural state including a state of the first IOV device, wherein the second virtualization environment includes a second IOV device, wherein migrating comprises transmitting the architectural state to the second virtualization environment, wherein the first VM including the architectural state is to be restored in the second virtualization environment.

10. The method of claim 9, wherein the second IOV device is to be initialized with the state of the first IOV device within the second virtualization environment.

11. The method of claim 9, wherein the migrating the architectural state is performed by the one or more cores executing instructions.

12. The method of claim 9, further comprising:

performing virtual to physical address translations using a set of page tables to provide access to the first address space.

13. The method of claim 12, wherein each entry in at least a subset of the set of page tables includes a mapping from a virtual address to a corresponding physical address of a page in the first address space.

14. The method of claim 13, wherein each entry further includes a bit to indicate whether a corresponding page in the first address space has been modified.

15. The method of claim 14, further comprising:

selectively migrating only those pages in the first memory space which were modified following transmitting of the architectural state.

16. A non-transitory machine-readable medium having program code stored thereon which, when executed by a machine, causes the machine to perform operations, comprising:

executing instructions by one or more cores coupled to a memory controller to implement a first virtualization environment comprising a hypervisor and a plurality of virtual machines (VMs);

selectively sharing an input/output virtualization (IOV) device by the plurality of VMs, wherein the IOV device is to expose capabilities in a plurality of memory-mapped IO (MMIO) registers, the hypervisor to access the plurality of MMIO registers to determine a subset of the capabilities to be provided to a first VM of the plurality of VMs, the IOV device comprising:

a plurality of assignable device interfaces (ADIs), a first ADI of the plurality of ADIs to be assigned to the first VM to provide the subset of capabilities to the first VM, the first ADI and the first VM associated with a first address space;

migrating an architectural state stored in the first address space and associated with the first VM to a second virtualization environment while the first VM is in a live or active state, the architectural state including a state of the first IOV device, wherein the second virtualization environment includes a second IOV device, wherein migrating comprises transmitting the architectural state to the second virtualization environment, wherein the first VM including the architectural state is to be restored in the second virtualization environment.

17. The non-transitory machine-readable medium of claim 16, wherein the migrating the architectural state is performed by the one or more cores executing instructions.

18. The non-transitory machine-readable medium of claim 16, further comprising program code to cause the machine to perform the operations of:

performing virtual to physical address translations using a set of page tables to provide access to the first address space.

19. The non-transitory machine-readable medium of claim 18, wherein each entry in at least a subset of the set of page tables includes a mapping from a virtual address to a corresponding physical address of a page in the first address space.

20. The non-transitory machine-readable medium of claim 19, wherein each entry further includes a bit to indicate whether a corresponding page in the first address space has been modified.

* * * * *